(12) United States Patent
Das et al.

(10) Patent No.: US 8,964,611 B2
(45) Date of Patent: Feb. 24, 2015

(54) DATA RESUME INDICATOR FOR MOBILE DEVICE POWER CONSERVATION

(75) Inventors: Soumya Das, San Diego, CA (US); Olufunmilola O. Awoniyi, San Diego, CA (US); Jangwon Lee, San Diego, CA (US); Nishith Chaubey, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 12/946,134

(22) Filed: Nov. 15, 2010

(65) Prior Publication Data

US 2012/0120858 A1 May 17, 2012

(51) Int. Cl.
*H04W 52/02* (2009.01)
(52) U.S. Cl.
CPC ............ *H04W 52/0229* (2013.01); *Y02B 60/50* (2013.01)
USPC ........................................ 370/311; 455/343.2
(58) Field of Classification Search
None
See application file for complete search history.

(56) References Cited

U.S. PATENT DOCUMENTS

| | | | | |
|---|---|---|---|---|
| 7,230,933 | B2 * | 6/2007 | Bahl et al. ................. | 370/311 |
| 7,542,437 | B1 * | 6/2009 | Redi et al. ................. | 370/311 |
| 8,094,595 | B2 * | 1/2012 | Montojo et al. ............ | 370/311 |
| 8,305,945 | B2 * | 11/2012 | Kim et al. .................. | 370/311 |
| 8,559,342 | B2 * | 10/2013 | Kim et al. .................. | 370/278 |
| 2006/0187876 | A1 * | 8/2006 | Schmidl et al. ............. | 370/328 |
| 2007/0153719 | A1 * | 7/2007 | Gopal ........................ | 370/328 |
| 2008/0144507 | A1 * | 6/2008 | Tseng ........................ | 370/235 |
| 2008/0218209 | A1 * | 9/2008 | Lee et al. ................... | 326/56 |
| 2009/0046789 | A1 * | 2/2009 | Xu et al. .................... | 375/260 |
| 2009/0086660 | A1 * | 4/2009 | Sood et al. ................. | 370/311 |
| 2009/0122812 | A1 * | 5/2009 | Steiner et al. .............. | 370/503 |
| 2009/0213800 | A1 * | 8/2009 | Lee et al. ................... | 370/329 |
| 2009/0221303 | A1 * | 9/2009 | Soliman ..................... | 455/458 |
| 2009/0285143 | A1 * | 11/2009 | Kwun et al. ................ | 370/311 |
| 2011/0116427 | A1 * | 5/2011 | Chang et al. ............... | 370/311 |
| 2011/0194420 | A1 * | 8/2011 | Park et al. .................. | 370/242 |

FOREIGN PATENT DOCUMENTS

WO    WO-2009111180 A1    9/2009

OTHER PUBLICATIONS

Bontu, et al, "DRX Mechanism for Power Saving in LTE", Jun. 2009, IEEE Communications Magazine, pp. 48-55.*
International Search Report and Written Opinion—PCT/US2011/060443—ISA/EPO—May 16, 2012.

* cited by examiner

*Primary Examiner* — Robert C Scheibel
(74) *Attorney, Agent, or Firm* — Jeffrey Jacobs

(57) ABSTRACT

A novel power conservation scheme is provided for conserving power in a wireless client terminal with an established communication session. While in a connected mode, the client terminal may receive data for the communication session via a data channel from an access point. During periods of inactivity over the data channel, the client terminal may switch to a lowered power mode, where the client terminal discontinuously monitors a control channel and does not monitor the data channel. The access point is informed of the operating mode of the client terminal. If a data resume indicator is received over the control channel, the client terminal switches back to the connected mode and resumes the communication session by receiving additional data over the data channel.

68 Claims, 24 Drawing Sheets

| Operating Modes | Channels Monitored | Channel Monitoring Cycle ($\alpha \leq \beta \leq \gamma$) |
|---|---|---|
| 202 — CONNECTED | Data Channel | $\alpha$ |
| 206 — LOWERED-POWER MODE | Control/Signaling Channels | $\beta$ |
| 204 — POWER CONSERVATION/ INACTIVE MODE | Paging Channels | $\gamma$ |

FIG. 3

UMTS RRC Connected States

| Operating Modes | Channels Monitored | Channel Monitoring Cycle |
|---|---|---|
| 502 — CELL_DCH | Dedicated Channel (Data and Control) | Continuous |
| 504 — CELL_FACH | Forward Access Channel (Common Downlink Channel – Data and Control) | Continuous |
| 508 — Lowered Power Mode | High-Speed Shared Control Channel (High-Speed Downlink Control Channel) | Discontinuous Reception (DRX) |

FIG. 5

EV-DO States

| Operating Modes | Channels Monitored | Channel Monitoring Cycle |
|---|---|---|
| 1002 — Active | Forward Traffic Channel, Forward Pilot Channel, Forward MAC Channel | Continuous |
| 1004 — Suspend | Forward Control Channel, Forward Pilot Channel | Continuous |
| 1006 — First Lowered Power Mode (Non-Proxy mode) | Sub-Synchronous Control Channel | Periodic |
| 1008 — Second Lowered Power Mode (Proxy mode) | Asynchronous Control Channel | Continuous |

FIG. 10

DATA RESUME INDICATOR FOR MOBILE DEVICE POWER CONSERVATION

BACKGROUND

1. Field

Various features pertain to wireless communication systems. At least one feature pertains to devices and methods for facilitating power conservation in a wireless client terminal in connected and monitoring modes by using a proxy device to monitor for a data resume indicator from the network for the client terminal.

2. Background

Client terminals, such as laptop computers, personal digital assistant devices, mobile or cellular phones, or any other device with a processor, that communicate with other devices through wireless signals are becoming increasingly popular. Client terminals are typically battery-powered and the amount of power a battery can provide is limited. With consumers using power intensive applications that run on the client terminals, particularly entertainment media and imaging applications, conserving battery power is important.

Client terminals may operate in one of several modes depending on the communication standard being implemented in a wireless network. For example, Wideband Code Division Multiple Access (WCDMA) includes various types of Radio Resource Control (RRC) states including Cell Dedicated Channel DCH (CELL_DCH), Cell Forward Access Channel FACH (CELL_FACH), Cell Paging Channel PCH (CELL_PCH), and UTRAN Registration Area URA Paging Channel PCH (URA_PCH), and an idle mode. Similarly, Evolution-Data Only (EV-DO) is part of the CDMA2000 family of standards and defines a plurality of EV-DO operating states, including active mode, suspend mode, and an idle mode, among others. Here, In a "connected" mode (e.g., UMTS RRC states CELL_DCH and CELL_FACH, and EV-DO Active mode) a client terminal may be fully or partially connected to a wireless network to receive and/or transmit data (e.g., voice or data calls or sessions) with one or more access points (e.g., base stations, Node B, femto cell, etc.). In such "connected" mode, conventional client terminals may consume a significant amount of power to sustain circuitry needed to monitor a data channel and/or maintain a connection with the wireless network. In idle mode, the client terminal may monitor control channels, such as a paging channel (PCH) for paging messages. Such paging messages may include messages that alert the client terminal to the occurrence of an incoming data message (e.g., a data packet or segment) and control/overhead messages that carry system information and other information for the client terminal. While power consumption in idle mode is substantially less than in connected mode, there is a longer delay in powering the circuitry and re-establishing a wireless network connection from idle mode if a message is received. This delay is relatively long (e.g., in comparison to delays in connected mode) and would impact the user experience noticeably (e.g., noticeable delay in receiving a message, a dropped message, increased retries from sender, etc.). Thus, maintaining the wireless terminal in connected mode results in faster power depletion or consumption but switching to idle mode results in a noticeable lag or delay.

Therefore, there is a need for a solution that reduces power consumption of a client terminal while in a connected mode, thereby avoiding noticeable delays typically associated with power-conserving modes of operation.

SUMMARY

One feature provides a system and method for facilitating power conservation in a client terminal during a communication session with an access point. During the communication session, where the client terminal is receiving data over a continuously-monitored data channel from the access point, there may be periods of inactivity (e.g., time periods in which no data is transmitted over the data channel). To conserve power during such periods, the client terminal may switch to a lowered power mode where it stops monitoring the data channel continuously and relies on a network-provided or femotcell-provided data resume indicator (DRI) sent at configurable intervals to know when additional data for the communication session will be sent. In this lowered power mode, the client terminal may discontinuously monitor channels and/or monitor fewer channels and, consequently, can turn off much of its radio circuitry to conserve power. For example, the client terminal may discontinuously monitor a control channel for the data resume indicator. By monitoring fewer channels and discontinuously monitoring those channels, the client terminal is able to conserve power and instead relies on the DRI from the network to know when it should start monitoring the data channel again for data associated with the communication session.

A method operational on a client terminal is provided for power conservation during an active communication session. The communication session may first be established with an access point. The client terminal is operated in a connected mode using a data channel during the communication session, where the operating mode of the client terminal is known to the access point. The client terminal may subsequently be switched to a lowered power mode after a period of inactivity in the data channel while the communication session remains active. For instance, the client terminal (or a wireless communication interface or circuit therein) may determine that the period of inactivity has exceed a threshold amount of time and independently switches to the lowered power mode.

In one example, in the lowered power mode the control channel is monitored discontinuously and the data channel is not monitored to conserve power. The control channel may then be monitored by the client terminal for a data resume indicator from the access point, where the data resume indicator is sent by the access point prior to transmission of data for the communication session. In some implementations, the client terminal may receive the data transmission over the control channel while operating in the lowered power mode.

In other implementations, upon receipt of the data resume indicator, the client terminal may be switched to the connected mode where it monitors the data channel for the data transmission from the access point. Subsequently, the client terminal may receive the data transmission from the access point over the data channel. The data for the communication session may be received at a fixed time offset from the reception of the data resume indicator. The client terminal may send a data resume indicator acknowledgement to the access point in response, wherein the data for the communication session is only transmitted by the access point after receipt of the data resume indicator acknowledgement.

According to one feature, the client terminal (or wireless communication interface or circuit therein) may send a message to the access point indicating that the client terminal is being switched to the lowered power mode. Alternatively, the client terminal (or wireless communication interface or circuit therein) may receive a message from the access point causing the client terminal to switch to the lowered power mode.

In general, in the lowered power mode the client terminal may consume less power than the connected mode. In one example, the wireless communication interface may be compatible with a Universal Mobile Telecommunications System (UMTS) Wideband Code Division Multiple Access (W-CDMA) air interface standard and the connected mode is one of a Radio Resource Control (RRC) Cell Dedicated Channel (CELL_DCH) mode or Cell Forward Access Channel (CELL_FACH) mode. For instance, the wireless communication interface implements Evolved High-Speed Packet Access (HSPA+) and the control channel is a High Speed-Shared Control Channel (HS-SCCH). In another example, the wireless communication interface may be compatible with an Evolution-Data Only (EV-DO) air interface standard and the connected mode is an Active mode. For instance, the control channel is a sub-synchronous control channel, enabling the client terminal to monitor only some control channel slots.

According to one implementation, the client terminal may include a wireless communication interface and a processing circuit. The wireless communication interface may be adapted for wirelessly communicating with an access point. The processing circuit may be coupled to the wireless communication interface and adapted to receive data messages via the wireless communication interface during a communication session. The wireless communication interface may be further configured to (a) operate in a connected mode using a data channel during the communication session, where the operating mode of the client terminal is known to the access point, (b) switch to a lowered power mode after a period of inactivity in the data channel while the communication session remains active, and/or (c) monitor a control channel for a data resume indicator from the access point, where the data resume indicator is sent by the access point prior to transmission of data for the communication session. The wireless communication interface may also determine that the period of inactivity has exceed a threshold amount of time and independently switches to the lowered power mode and/or send a message to the access point indicating that the client terminal is being switched to the lowered power mode. In response, the wireless communication interface may receive a message from the access point causing the client terminal to switch to the lowered power mode.

According to one feature, the client terminal may also include a secondary communication interface for communicating with a proxy device. The processing circuit may be coupled to the secondary communication interface and configured to: (a) send a proxy request to the proxy device to monitor one or more control channels on behalf of the client terminal, (b) power off the wireless communication interface, and/or (c) monitor a second control channel over the secondary communication interface for a data resume indicator from the proxy device. The secondary communication interface may be a low power interface relative to the wireless communication interface. The data resume indicator from the proxy device may precede transmission of data for the communication session over the wireless communication interface by the access point. In one example, the second control channel may be an asynchronous control channel which is continuously monitored by the client terminal via the secondary communication interface. Upon receipt of a data resume indicator from the proxy device, the processing circuit is adapted to: (a) power on the wireless communication interface, and/or (b) monitor a traffic channel over the wireless communication interface for an expected data transmission for the communication session.

A method operational on an access point is provided for facilitating power conservation of a client terminal during an active communication session. The communication session may be established between the access point and a client terminal. The access point may then wirelessly send data messages to the client terminal over a data channel during the communication session. The access point may subsequently determine that the client terminal has switched to a lowered power mode due to inactivity over the data channel. For instance, the access point may receive a message from the client terminal indicating that the client terminal is switching to the lowered power mode. Alternatively, the access point may determine that the data channel has been inactive for a threshold amount of time and, consequently, sends a message to the client terminal indicating that the client terminal switch to the lowered power mode.

Therefore, the access point may subsequently send a data resume indicator to the client terminal over a control channel prior to transmission of additional data for the communication session. For instance, the data resume indicator may be sent in response to receipt of data for the communication session of the client terminal. The data may be sent to the client terminal over the control channel, without the need to reestablish the data channel. Alternatively, the data may be sent by the access point to the client terminal over the data channel after a fixed time offset from sending the data resume indicator. In one example, the data may be sent to the client terminal over the data channel after the reception of a data resume indicator acknowledgement from the client terminal.

In one implementation, the access point may include a wireless communication interface and a processing circuit. The wireless communication interface may be adapted for wirelessly communicating with a client terminal. The processing circuit may be coupled to the wireless communication interface and adapted to send data messages to the client terminal over a data channel via the wireless communication interface during a communication session. The processing circuit may be configured to (a) determine that the client terminal has switched to a lowered power mode due to inactivity over the data channel, and/or (b) send a data resume indicator to the client terminal over a control channel prior to transmission of additional data for the communication session.

In one example, the wireless communication interface may be compatible with a Universal Mobile Telecommunications System (UMTS) Wideband Code Division Multiple Access (W-CDMA) air interface standard and the connected mode is one of a Radio Resource Control (RRC) Cell Dedicated Channel (CELL_DCH) mode or Cell Forward Access Channel (CELL_FACH) mode.

For instance, the wireless communication interface may implement Evolved High-Speed Packet Access (HSPA+) and the control channel may be a High Speed-Shared Control Channel (HS-SCCH).

In another example, the wireless communication interface is compatible with an Evolution-Data Only (EV-DO) air interface standard and the connected mode is an Active mode. For instance, the control channel may be a sub-synchronous control channel, enabling the client terminal to monitor only some control channel slots.

In one implementation, the access point may operate as a femto cell and operates as a proxy for the client terminal, where the data resume indicator is sent to the client terminal via a secondary communication interface distinct from the wireless communication interface.

According to yet another feature, a method operational on a proxy device is provided for facilitating power conservation in a client terminal. The proxy device may receive a request from a client terminal to operate as a proxy for the client terminal. Consequently, the proxy device may monitor for at least one of either (a) data on a data channel from the client terminal via the first communication interface for a previously established communication session between the client terminal and an access point; and/or (b) a data resume indicator on a control channel for the client terminal via a first communication interface of the proxy device, where the data resume indicator precedes the transmission of additional data for the previously established communication session between the client terminal and an access point. Upon receipt of the data resume indicator, the proxy device may send the data resume indicator to the client terminal via a second communication interface of the proxy device for resumption of the previously established communication session. In one example, the data resume indicator is asynchronously transmitted to the client terminal over a control channel via the second communication interface.

The proxy device may receive a data resume indicator acknowledgment from the client terminal over the second communication interface. As a result, of the acknowledgment, the proxy device may transmit the data resume indicator acknowledgement to the access point via the first communication interface. Additionally, the proxy device may monitor a data channel for the client terminal over the first communication interface for incoming data for the previously established communication session. The proxy device may then forward the received data to the client terminal.

According to one implementation, a proxy device may include a first communication interface, a second communication interface, and/or a processing circuit. The first communication interface may be adapted for wirelessly communicating with an access point. The second communication interface may be adapted for wirelessly communicating with a client terminal. The processing circuit may be adapted to receive a request from a client terminal to operate as a proxy for the client terminal. The proxy device may then monitor for at least one of either: (a) data on a data channel from the client terminal via the first communication interface for a previously established communication session between the client terminal and the access point, and/or (b) a data resume indicator on a control channel for the client terminal via the first communication interface, where the data resume indicator precedes the transmission of additional data for the previously established communication session between the client terminal and the access point. The proxy device may then send the data resume indicator to the client terminal via the second communication interface for resumption of the previously established communication session. In one example, the second communication interface may have lower power and shorter range transmission relative the first communication interface. Note that due to the proxy device operation, the access point may believe that the client terminal is operating in a lowered power mode where the client terminal is monitoring its control channel for the data resume indicator.

BRIEF DESCRIPTION OF THE DRAWINGS

The features, nature, and advantages of the present features may become more apparent from the detailed description set forth below when taken in conjunction with the drawings in which like reference characters identify correspondingly throughout.

FIG. 3 is a table illustrating one example of the operating modes for a client terminal and their corresponding monitored channels and monitoring cycles.

FIG. 5 illustrates one example of channel monitoring in different UMTS connected states along with a lowered power mode.

FIG. 10 illustrates one example of the channel monitoring in EV-DO connected state along with a lowered power mode.

DETAILED DESCRIPTION

Figure 1:
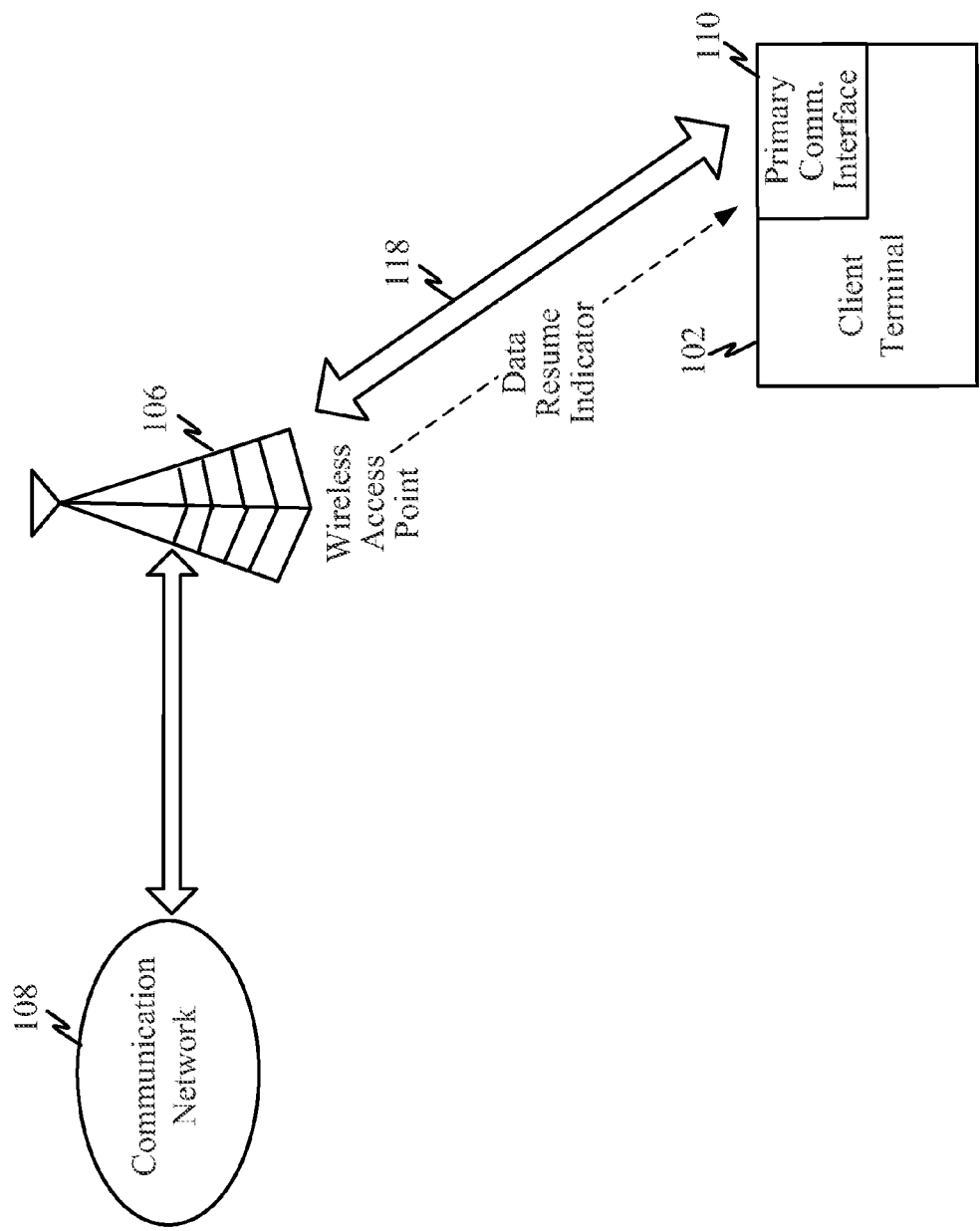
FIG. 1 is a block diagram illustrating a wireless communication system in which power conservation in a client terminal is facilitated by use of a data resume indicator.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

In the following description, certain terminology is used to describe certain features of one or more embodiments. For instance, the term "access point" refers to a device that facilitates wireless connectivity (for wireless communication devices) to a communication or data network. The term "access point" may include base stations, Node-B devices, femto cells, pico cells, etc. The term "client terminal" refers to mobile phones, pagers, wireless modems, personal digital assistants, personal information managers (PIMs), palmtop computers, laptop computers, and/or other mobile communication/computing devices which communicate, at least partially, through a wireless or cellular network. The term "proxy device" may include any device having wireless communication capabilities that receives data messages intended for a client terminal over a primary communication interface and/or forwards such data messages to the intended client terminal over a secondary communication interface.

Overview

One feature provides a system, apparatus, and method for facilitating power conservation in a client terminal by using a data resume indicator (DRI) from a wireless network. An exemplary client terminal may include a primary communication interface with which it can wirelessly transmit and/or receive data and/or control signals over a one or more channels of a wireless network (e.g., to/from a wireless access point). The client terminal may be powered by an internal power source (e.g., battery) that powers its primary communication interface. During operation, the client terminal may operate its primary communication according to various connected modes and/or power conservation modes. To lengthen the useful life of the internal power source while in a connected mode (e.g., EV-DO Active state or UMTS RRC CELL_DCH and CELL_FACH), one feature may provide for the client terminal to operate in the lowered power mode to conserve power by monitoring fewer channels than it normally would in the connected mode, discontinuously monitoring of those channels, turning off circuitry used for monitoring the data channel in connected mode, and/or reliance on a data resume indicator to resume the connected mode operations. In such lowered power mode, the client terminal may implement longer channel monitoring cycles where some or all channels are monitored less frequently. For instance, rather than continuously or periodically monitoring a data channel while in the connected mode, the client terminal may merely discontinuously monitor a control channel on which it expects to receive an DRI prior to a data message being sent over the data channel. Thus, the client terminal may monitor only certain channels (e.g., slots), making the monitoring cycle longer, and thereby lowering power consumption. Note that the lowered power mode may be different and distinct from the power conservation modes defined by a particular standard. For instance, a lowered power mode may be a modification or adjustment of a connected mode. For example, in such lowered power mode, certain control channel(s) may be monitored more frequently than they would otherwise be if they were being monitored in a power conservation mode. In one implementation, such control channel(s) may be monitored at the same monitoring cycle as in the connected mode, but other channels monitored in the connected mode are not monitored in the lowered power mode.

The client terminal may switch between a connected mode and its lowered power mode either on its own or under the direction or instructions received from the wireless network (e.g., access point) that services the primary communication interface. Examples of connected modes may include, for instance, Radio Resource Control states—CELL_DCH, CELL_FACH, CELL_PCH, and URA_PCH. To do this, the client terminal, while in connected mode, either informs the wireless network (e.g., wireless access point) that it is switching to the lowered power mode or is told by the wireless network to switch to the lowered power mode (e.g., after a period of inactivity over a data channel during a data transmission session). Knowing that the client terminal is operating in the lowered power mode, the network may subsequently use a data resume indicator (DRI) (sent via a specified control channel) to indicate to the client terminal when it should switch from the lowered power mode back to the connected mode. That is, when the wireless network receives data to be sent to the client terminal, it sends the data resume indictor (DRI) to the client terminal first, informing it to expect data over a channel available only in a connected mode. Note that the DRI may be transmitted over a first channel (e.g., a signaling/control channel) monitored by the client terminal during lowered power state. By contrast, the subsequent data may be transmitted by the wireless network (e.g., access point) over a second channel (e.g., a data channel) that is only monitored by the client terminal during a connected mode. Therefore, upon receipt of such DRI, the client terminal switches to connected mode, where it then monitors the second channel on which the data transmission is expected.

According to another aspect, the data transmission may be sent after a pre-configured fixed offset from the transmission of the DRI (e.g., after a specified number of slots from the DRI). The offset may allow the client terminal, which has been put in the lowered power mode, enough time to restore all wireless receiver components to full functionality before the pending or incoming data is sent from the access point/network. In an alternative implementation, the network (access point) sends the DRI and then waits to receive a DRI acknowledgment from the client terminal prior to sending the data over the data channel. This guarantees that the client terminal is ready to receive the data message over the data channel.

According to yet another feature, the client terminal may rely on a proxy device to receive data messages on behalf of the client terminal while the client terminal ceases to listen for data/control messages from the wireless network (access point). For example, the client terminal may shut-off or power down its primary communication interface to the wireless network (access point) while periodically monitoring for communications (e.g., using a secondary communication interface) from its proxy device. Thus, when the proxy device receives a data message intended for the client terminal from the access terminal, it may generate and send a DRI to the client terminal (e.g., over the secondary communication interface). In one implementation, the client device may then receive the data message (buffered by the proxy device) via its secondary communication interface. In an alternative implementation, receipt of the DRI may cause the client terminal to power on its primary communication interface and monitor a data channel for a transmission/retransmission of the data message from the wireless network (access point). In yet another implementation, the wireless network (access point) sends a DRI that is received by the proxy device and which the proxy device then forwards to the client terminal over the secondary communication interface.

Exemplary Client Terminal with Lowered Power Mode for Power Conservation During a Communication Session FIG. 1 is a block diagram illustrating a wireless communication system in which power conservation in a client terminal is facilitated by use of a data resume indicator. A client terminal 102 may be capable of communicating through a communication network 108 via one or more wireless access points 106 (e.g., base stations or Node Bs, femto cells, pico cells, etc.) that may be part of the communication network 108. The client terminal 102 may include primary communication interface 110 (or transceiver) for communicating directly with the wireless access point 106 through a first wireless link 118. The wireless link 118 may carry one or more data channels, control/signaling channels, and/or paging channels between the wireless access point 106 and one or more client terminals 102. The wireless link 118 may carry downlink or forward link channels (i.e., from the access point 106 to the client terminal 102) and uplink or reverse link channels (i.e., from the client terminal 102 to the access point 106). The client terminal 102 may be powered by an internal (limited) power source (e.g., battery).

The client terminal 102 may typically operate in various modes, including a connected mode and a power conservation/inactive mode. While in the connected mode, the client terminal 102 may use its primary communication interface to communicate with the access point 106 to establish a call/session for receiving and/or transmitting data messages. In connected mode, the client terminal may continuously or periodically monitor one or more data channels and/or control/signaling channels. In power conservation/inactive mode (e.g., idle/sleep mode), the client terminal 102 may not monitor the one or more data channels and may monitor the control/signaling channels less frequently (e.g., longer channel monitoring cycles). The operating mode of the client terminal 102 (or it primary communication interface 110) may be communicated to and/or set by wireless access point 106 or other entity of the communication network 108.

During a communication session (e.g., where data messages are being received by the client terminal from an access point), the client terminal 102 may operate in a connected mode where it frequently or continuously monitors one or more data channels for incoming data messages. However, there may be periods of inactivity over the one or more data channels when no data messages are being received during the active communication session. Thus, it would be beneficial for the client terminal 102 to try to implement some type of power conservation. However, switching from a connected mode to a typical power conservation/inactive mode is not always practical since, due to the longer (less frequent) channel monitoring cycle in the power conservation/inactive mode, unacceptably long delays may be perceived in receiving data messages. Additionally, in power conservation/inactive modes, part of the primary communication interface 110 (e.g., receiver radio circuits) may be shut down. Thus, switching from the power conservation/inactive mode back to the connected mode may be delayed by having to restart parts of the primary communication interface 110.

According to one feature, while the client terminal 102 is in a connected mode and has an active communication session, it may be configured to switch to a lowered-power mode when a period of inactivity is detected over its one or more data channels. This lowered-power mode may be a modified version of the connected mode and distinct from the typical power conservation/inactive modes defined by standards.

Figure 2:
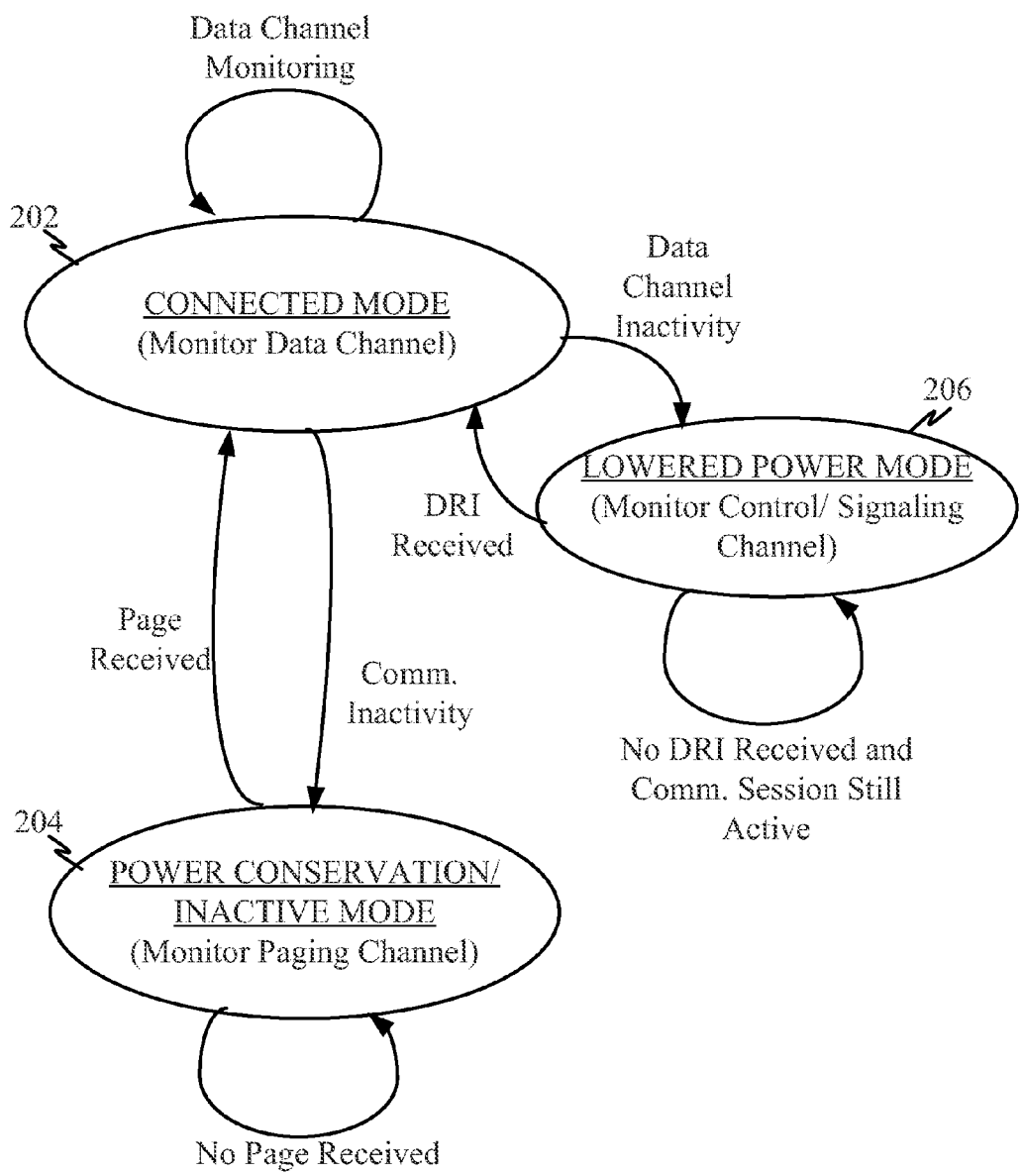
FIG. 2 illustrates one example of a state diagram showing how the client terminal may be operated to switch among different operating modes to conserve power.

FIG. 2 illustrates one example of a state diagram showing how the client terminal may be operated to switch among different operating modes to conserve power. For example, the client terminal may generally operate between three modes, connected mode 202, power conservation/inactive mode 204, and lowered power mode 206. In some implementations, the connected mode 202 and power conservation/inactive mode 204 may include one or more sub-modes of operation. The client terminal may operate in the connected mode 202 during an active communication session where it may monitor data and/or control/signaling channels. The client terminal may stay in the connected mode 202 while there is an active data communication session (e.g., while a data channel is active and/or while a control channel is continuously monitored). If there are no active communication sessions, the client terminal may switch to the power conservation/inactive mode 204 where it may only monitor a paging channel (but not the data channel). In the power conservation/inactive mode 204, the client terminal may monitor the paging channel until a page is received, at which time it switches back to the connected mode 202.

The lowered power mode 206 is herein defined to provide some power conservation while the client terminal still has an active communication session. That is, if during an active data communication session there is a period of data channel inactivity (e.g., a data messages are not being continuously received or not being received at every expected/available data channel slot), then the client terminal may switch to the lowered power mode 206. In this lowered power mode 206, the data channel may not be monitored, but the control/signaling channel is monitored by the client terminal. The communication network (access point 106) may be notified of this mode change from the connected mode to the lowered-power mode. Therefore, the communication network (access point 106) knows to send a data resume indicator (DRI) (over the control/signaling channel) when an additional data message is available for the active communication session with the client terminal. Thus, upon receipt of the DRI by the client terminal, it switches from the lowered power mode 206 back to the connected mode 202 and monitors the data channel in expectation of the data message that is part of its active communication session.

FIG. 3 is a table illustrating one example of the operating modes for a client terminal and their corresponding monitored channels and monitoring cycles. In the connected mode 202, the client terminal may monitor data, control/signaling, and/or paging channels according to a first monitoring cycle $\alpha$. In the lowered power mode, the client terminal may monitor the control/signaling channels (not the data channels) according to a second monitoring cycle $\beta$, where $\beta \geq \alpha$. Note that, the control/signaling channels may be monitored just as often in both the connected and lowered power modes, but because the data channels are not being monitored in the lowered power mode, the overall power consumption is lower (e.g., because only a subset of channels are being monitored and/or monitoring is discontinuous or periodic in the lowered power mode). In the power conservation/inactive mode, the client terminal may monitor the paging channels (not the data and/or control/signaling channels) according to a third monitoring cycle γ, where γ≥β.

Note that the decision to switch from the connected mode 202 to the lowered power mode 206 may be unilaterally or independently made by the client terminal 102, but the change in operating mode is conveyed to the network 108 (access terminal 106) so that it knows a DRI should be sent prior to transmitting a data message over the data channel. In alternative implementations, the network 108 (access terminal 106) may command the client terminal 102 to switch from the connected mode 202 to the lowered power mode 206 when it notices a period of inactivity within an active communication session (e.g., no data messages sent over the data channel for a period of time).

Note that the data channel used in connected mode 202 may be different or distinct from signaling/control channels typically used in power conservation mode/inactive 204. In particular, the data channel may carry various types of content, data and/or control signals and is continuously or frequently monitored in connected mode 202. On the other hand, a signaling/control channel does not carry data and is typically monitored only periodically. In some cases, a paging channel may be considered a type of control/signaling channel. FIG. 2 is a simplified state diagram and additional states or sub-states may be possible (and are contemplated) within the connected mode 202 and/or the power conservation/inactive mode 204.

Exemplary Primary Communication Interface

One example of the primary communication interface 110 may be a long range, high power, and/or high bandwidth communication interface such as a W-CDMA compliant transceiver. However, in other examples, such high power interface may operate according contemporary communication standards, including but not limited to W-CDMA, cdma2000, GSM, WiMax, and WLAN. The power conservation techniques described herein may be implemented on various types of wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), CDMA2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). CDMA2000 is described in documents from a consortium named 3rd Generation Partnership Project 2 (3GPP2).

Exemplary Operating Modes

Figure 4:
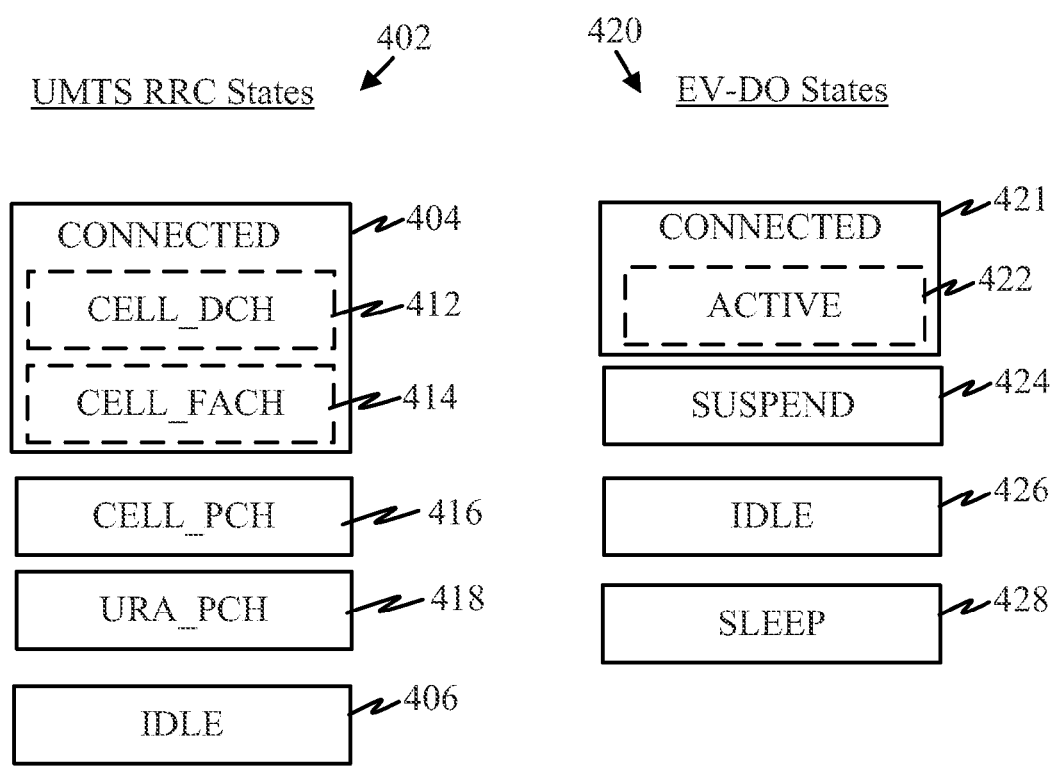
FIG. 4 illustrates two examples of operating mode hierarchies for different wireless communication standards (EV-DO and UMTS).

In various examples, the client terminal operating modes may be defined by a communication standard, such as Evolution-Data Only (1x EV-DO) and/or Universal Mobile Telecommunications System (UMTS). FIG. 4 illustrates two examples of operating mode hierarchies for different wireless communication standards (EV-DO and UMTS). Generally, a "connected mode" refers to an operating state in which the primary communication interface is enabled, activated or powered on to monitor at least one or more data channels (e.g., continuously, periodically powered on, momentarily powered on) and/or to maintain an active communication session. By contrast, a "power conservation/inactive mode" (e.g., idle or sleep modes) refers to an operating state in which the primary communication interface is not continuously monitoring a data channel but instead periodically monitors a control/signaling (e.g., paging) channel. Note that the modes illustrated in UMTS RRC States 402 and EV-DO States 420 are merely exemplary and actual implementations may have fewer, different, and/or additional modes, states, and/or sub-states. Regardless of the actual modes/states implemented by a client terminal, the lowered power mode described herein may be implemented during an active communication session to conserve power.

In one example, the Universal Mobile Telecommunications System (UMTS) Wideband Code Division Multiple Access (W-CDMA) is an air interface standard that specifies a Radio Resource Control (RRC) defining various modes of operation for a client terminal. The UMTS RRC States 402 define a connected mode 404 that may include a plurality of sub-modes, including CELL_DCH 412 and CELL_FACH 414. In the CELL_DCH 412 and CELL_FACH 414 connected modes, the client terminal may be monitoring (either continuously or periodically) one or more data channels for incoming data messages. In the CELL_DCH state 412, the client terminal monitors a dedicated data channel typically used for high volume data. In the CELL_FACH state 414, the client terminal monitors a shared forward access channel typically used for low volume data. By contrast, in CELL_PCH 416 and URA_PCH 418 modes, the client terminal is monitoring paging channels, not a data channel. Therefore, when implemented in a UMTS-compliant client terminal, the lowered power mode described herein for power conservation may be implemented when the client terminal is operating in connected modes CELL_DCH 412 and CELL_FACH 414 (e.g., when there is an active data communication session over a data channel).

The idle mode 406 (e.g., an inactive mode) may have the lowest power consumption (e.g., paging channel is periodically monitored at a relatively long channel monitoring cycle). In one example, CELL_FACH 414 consumes roughly fifty percent the power of CELL_DCH 412, and CELL_PCH 416 consumes just a few percent of the power consumption of CELL_DCH 412.

Referring again to FIG. 4, Evolution-Data Only (EV-DO) is part of the CDMA2000 family of standards and defines a plurality of EV-DO operating states 420, including an active mode 422, a suspend mode 424, an idle mode 426, and a sleep mode 428. Here, the connected mode 421 may include the active mode 422.

Exemplary Lowered Power Mode in UMTS System

FIG. 5 illustrates one example of channel monitoring in different UMTS RRC connected states along with a lowered power mode. In CELL_DCH mode 502, a client terminal may monitor a dedicated channel (e.g., capable of carrying both data and control messages) continuously. In CELL_FACH mode 502, the client terminal may monitor a forward access channel (e.g., a common downlink channel carrying both data and control messages) continuously. By contrast, in CELL_PCH and URA_PCH modes, the client terminal may monitor a paging channel (e.g., a downlink control channel carrying control messages) in a discontinuous reception mode.

According to one implementation, a lowered power mode 508 may also be implemented to achieve power conservation from the CELL_DCH mode 502 and/or the CELL_FACH mode 504. The network and/or access point may be aware that the client terminal has switched from the connected modes CELL_DCH and CELL_FACH to the lowered power mode 508 and uses a data resume indicator (DRI) to inform the client terminal when a data message is upcoming. In one example, such as when Evolved High-Speed Packet Access (HSPA+) is implemented (i.e., wireless broadband standard defined in 3GPP release 7), the DRI may be sent by the network or access point over a High Speed-Shared Control Channel (HS-SCCH) (e.g., a physical layer channel) to the client terminal. In this example, the client terminal may be compliant with HSPA+, may have High-Speed Downlink Packet Access (HSDPA) and/or a High-Speed Uplink Packet Access (HSUPA) channels configured, and (in the lowered power mode 508) is monitoring a High-Speed Shared Control Channel in discontinuous reception (DRX) due to the low activity level in the network during an active communication session.

Use of the DRI while the client terminal is in the lowered power mode 508 allows the client terminal enough time to restore all communication interface components to full functionality (i.e., for CELL_DCH 502 or CELL_FACH modes 504 reception) before data/control information is sent from the network (or access terminal) over the forward access channel or dedicated channel. In one example, the network (or access point) may send the DRI using reserved bits in the HS-SCCH to indicate an upcoming data/control transmission in the next DRX cycle to client terminal. Note that while the lowered-power mode 508 may use discontinuous reception (DRX), it may be a substantially shorter monitoring cycle (e.g., between 50 and 150 milliseconds) than the monitoring cycle of the paging channel in CELL_PCH or URA_PCH modes.

Figure 6:
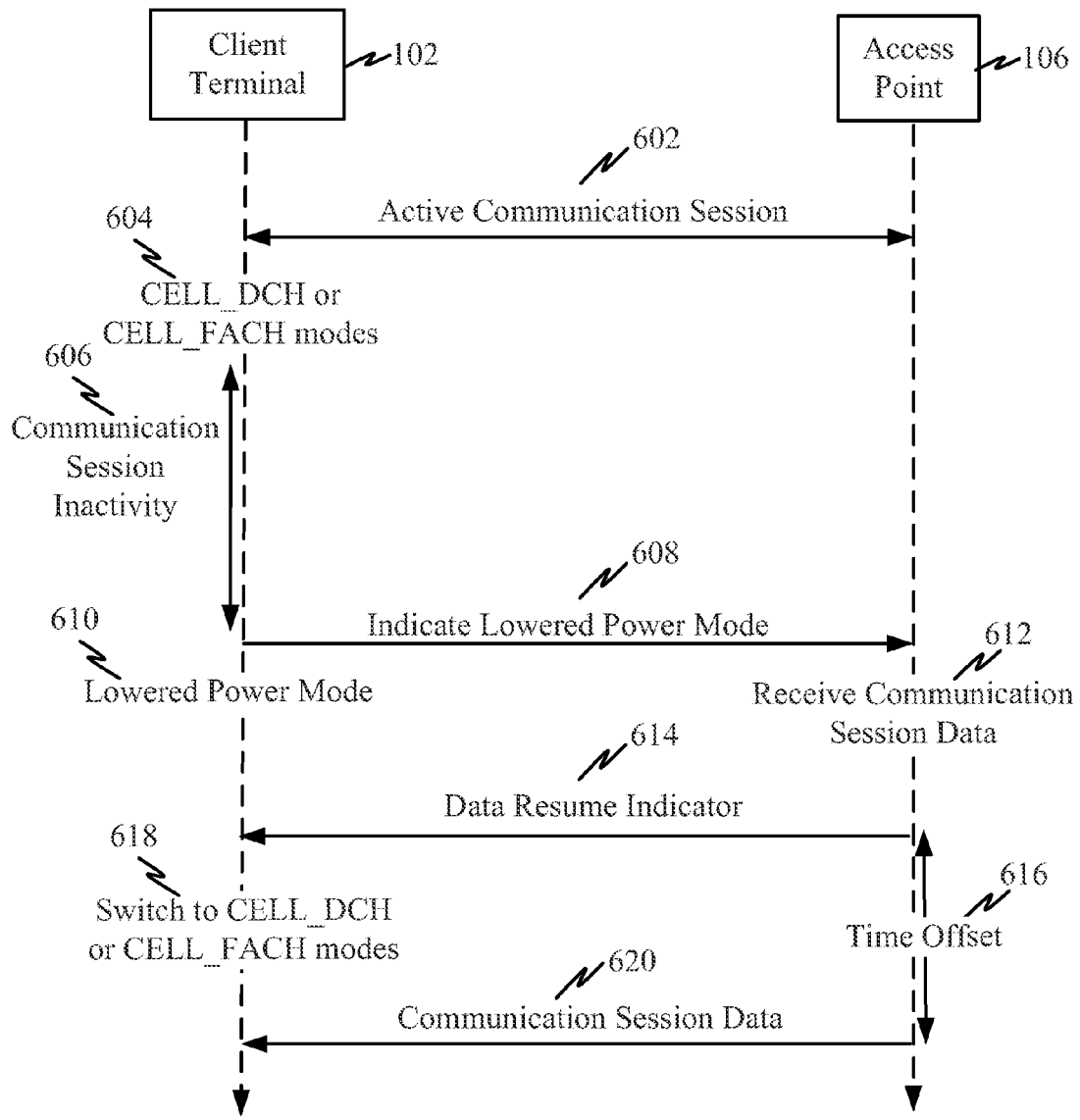
FIG. 6 is a block diagram illustrating the operation of a client terminal and an access point to achieve power conservation during an active communication session in a UMTS communication system.

FIG. 6 is a block diagram illustrating the operation of a client terminal and an access point to achieve power conservation during an active communication session in a UMTS communication system. An active communication session 602 is present between the client terminal 102 and the access point 106. Such active communication session 602 means that data is between transmitted between the access point 106 and client terminal 102. Consequently, the client terminal 102 may be operating in either a CELL_DCH mode or a CELL_FACH mode 604. Note that, even during the active communication session 602, there may be periods of inactivity (or extended inactivity). Therefore, if communication session inactivity 606 is detected (e.g., no communication session data activity for a threshold amount of time), then the client terminal 102 may indicate a lowered power mode 608 to the access point 106. After sending such lowered power mode indicator 608, the client terminal may enter a lowered power mode 610. This lowered power mode 610 occurs even though the communication session is still active. Subsequently, the access point 106 may receive communication session data 612 for the client terminal 102. Upon receipt of such data, the access point (knowing that the client terminal is in the lowered power mode) sends a data resume indicator (DRI) 614 to the client terminal 102. The client terminal 102, upon receipt of the DRI knows that it will be receiving data and switches to the CELL_DCH or CELL_FACH modes 618. In this example, the access point 106 waits for a fixed time offset after sending the DRI and then sends the communication session data 620.

Figure 7:
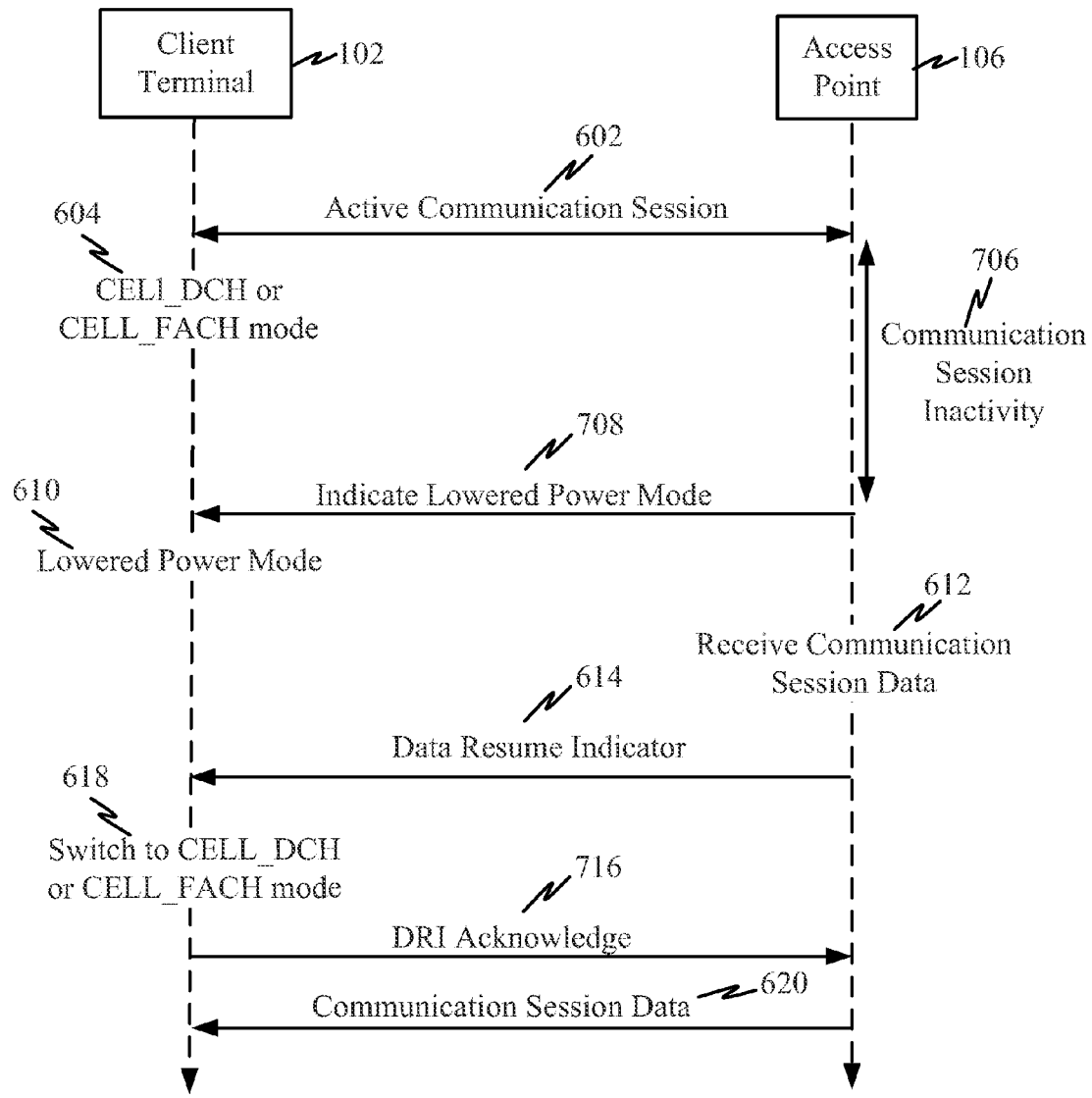
FIG. 7 is a block diagram illustrating an alternative to FIG. 6 to achieve power conservation during an active communication session in a UMTS communication system.

FIG. 7 is a block diagram illustrating an alternative to FIG. 6 to achieve power conservation during an active communication session in a UMTS communication system. In this example, rather than the client terminal 102 entering the lowered power mode on its own, the access point 106 measures or monitors the communication session inactivity 706 and sends a lowered power mode indicator 708 to the client terminal 102. Thus, the access point 106 may control when the client terminal 102 should enter the lowered power mode during an active communication session. Another alternative feature illustrated here is that, rather than waiting a fixed time offset between sending the DRI and sending the communication session data, the access point 106 instead waits for a DRI acknowledgement message 716 from the client terminal 102 before sending the communication session data 620. This assures that the client terminal 102 has been able to restore its receiver from the lowered power mode to the CELL_DCH or CELL_FACH modes.

Figure 8:
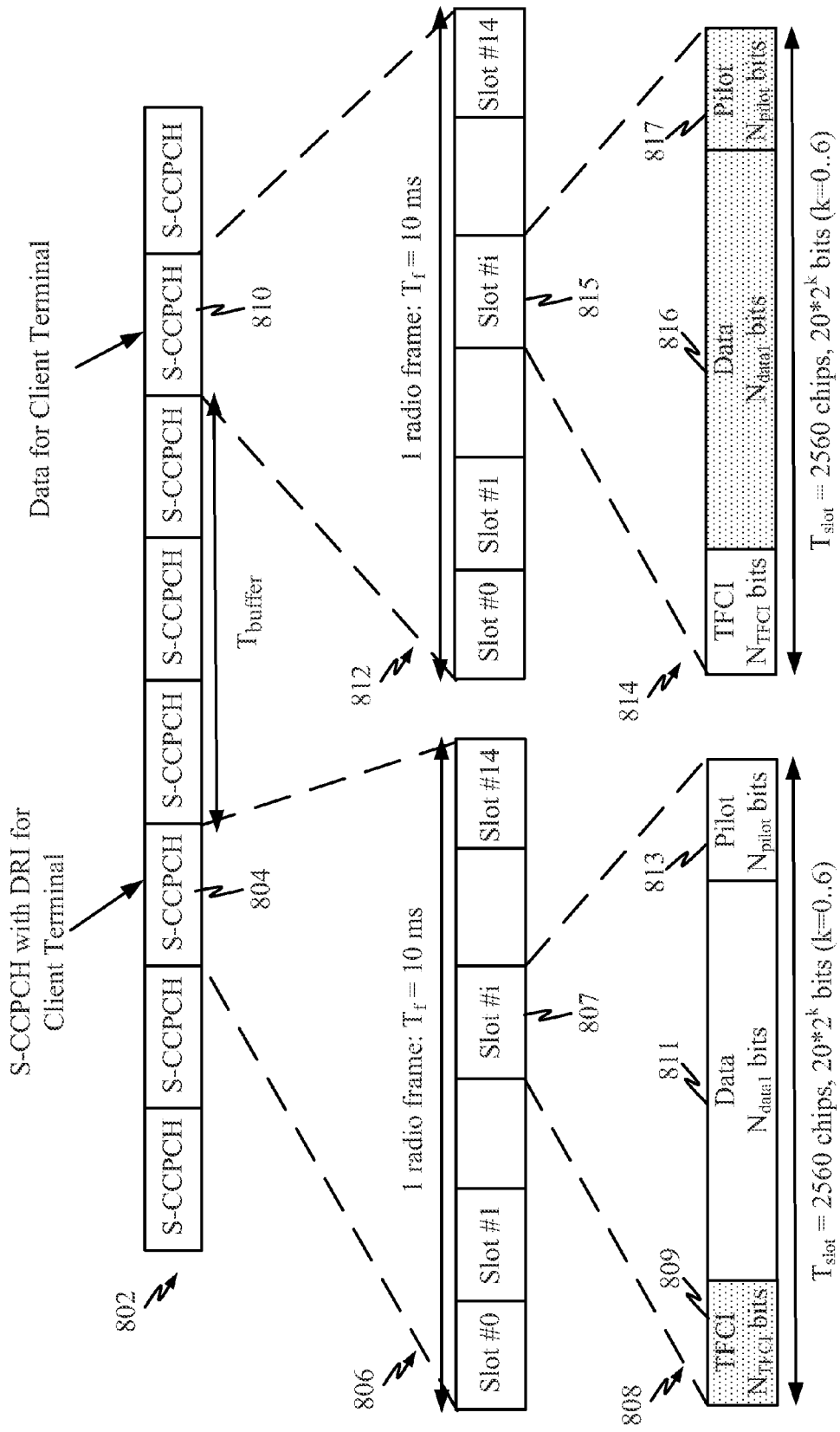
FIG. 8 illustrates an example of how a data resume indicator may be implemented within a Secondary Common Control Physical Channel (S-CCPCH) in a UMTS system.

FIG. 8 illustrates an example of how a data resume indicator may be implemented within a Secondary Common Control Physical Channel (S-CCPCH) in a UMTS system. In the lowered power mode, the client terminal may be monitoring the S-CCPCH channel 802. The S-CCPCH channel 802 is illustrated comprising a plurality of frames. In this example, the data resume indicator (DRI) is transmitted in a first frame 804 while the corresponding data is transmitted in a second frame 810. In this example, the second frame 810 (data) is transmitted a time offset $T_{buffer}$ after the transmission of the first frame 804 (DRI). The time offset $T_{buffer}$ may be prefixed or configurable and may allow the client terminal sufficient time to switch from the lowered power mode to a connected mode.

Each frame in the S-CCPCH channel 802 may be segmented into a plurality of slots. Here, the first frame 804 may include a plurality of slots 806 from which a first slot 807 is used to transmit the data resume indicator (DRI). Each slot may be further defined by a plurality of fields 808, e.g., transport format combination indicator (TFCI) bits 809, Data bits 811, and Pilot bits 813. In this example, the data resume indicator (DRI) may be included as one or more bits within the TFCI bits 809. The data may then be transmitted within a first slot 815 from a plurality of slots 812 in the second frame 810, where the data may be embedded in the Data bits 816 and/or Pilot bits 817 in a plurality of fields 814 for the slot 815. In this manner, an access point may provide the DRI and data to a client terminal when a lowered power mode is implemented.

Figure 9:
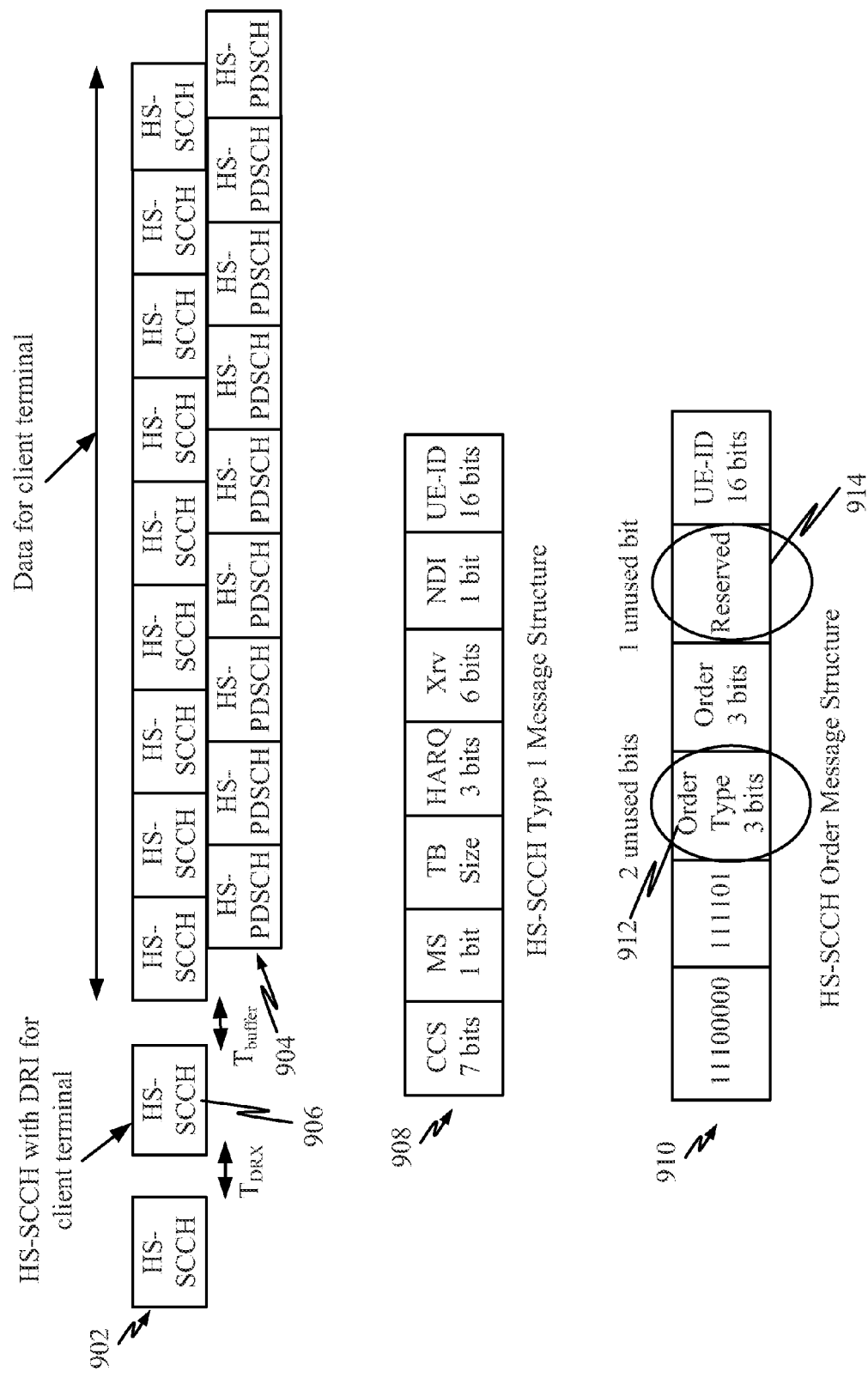
FIG. 9 illustrates an example of how a data resume indicator may be implemented within a in a UMTS system that supports Evolved High-Speed Packet Access (HSPA+).

FIG. 9 illustrates an example of how a data resume indicator may be implemented within a in a UMTS system that supports Evolved High-Speed Packet Access (HSPA+). In the lowered power mode, the client terminal may be monitoring a High Speed-Shared Control Channel (HS-SCCH) 902. In this example, the HS-SCCH 902 may include a plurality of sequential frames that are monitored according to a discontinuous monitoring cycle $T_{DRX}$ by the client terminal. For example, the discontinuous monitoring cycle $T_{DRX}$ may 0, 40 to 320 milliseconds. Here, a first frame 906 in the HS-SCCH channel 902 may be used to send a data resume indicator (DRI) from the access point to the access terminal. After a time offset $T_{buffer}$ from sending the DRI, the corresponding data may be transmitted in the HS-SCCH channel 902 and/or a High-Speed Physical Downlink Shared Channel (HS-PDSCH) 904. For example, the time offset may be between zero (0) and a max delay, where the maximum delay is the maximum amount of time for the client terminal to switch from the lowered power mode to the CELL_DCH or CELL_FACH mode. The HS-SCCH channel Type 1 Message structure 908 used in HSDPA may include Channelisation Code Set (CCS) bits, Modulation Scheme (MS) bits, and Transport Block Size Index (TB Size) bits of fixed size. This Type 1 Message structure 908 may be modified as an HS-SCCH Order Message Structure 910 with some fixed-value fields. In this HS-SCCH Order Message Structure 910, there are two (2) unused bits in the Order Type field 912 and one (1) used bit in the Reserved field 914. Thus, the DRI may be embedded within these unused bits (within the Order Type field 912 and Reserved field 914) in the HS-SCCH Order Message Structure 910. The corresponding data may then be transmitted (after the time offset $T_{buffer}$) to the client terminal over the HS-SCCH 902 and/or HS-PDSCH channel 904. The time offset $T_{buffer}$ may be prefixed or configurable and may provide the client terminal sufficient time to switch from the lowered power mode to a connected mode.

Exemplary Lowered Power Mode in EV-DO System

FIG. 10 illustrates one example of the channel monitoring in EV-DO connected state along with a lowered power mode. EV-DO may use multiplexing techniques to maximize both individual client terminal throughput and overall system throughput. EV-DO is standardized by 3rd Generation Partnership Project 2 (3GPP2) as part of the CDMA2000 family of standards. In active mode 1002, a client terminal may monitor a forward traffic channel (e.g., capable of carrying both data and control messages), a forward pilot channel, and/or a forward Media Access Control (MAC) channel. One or more of these channels may be a shared among a plurality of client terminals. In one example, each access terminal may be allocated timeslots in the traffic channel based on its instantaneous data rate control (DRC) request and average throughput. In suspend mode 1004, the client terminal may drop the traffic (data) channel but may monitor a control channel continuously, thereby maintaining some system resources to allow a quick return to the active mode 1002.

In one example, the lowered power mode may have multiple sub-modes depending on whether a proxy device is available to assist in monitoring one or more channels while the access terminal conserves power. A data resume indicator (DRI) may be used to awaken the access terminal prior to transmission over the traffic channel. In EV-DO, a data resume indicator (DRI) may be sent in either sub-synchronous control channel capsules (e.g., at regular slot intervals) or in asynchronous control channel capsule (e.g., with no regular interval, or in an as needed basis).

When a proxy device is not available (i.e., non-proxy mode), the client terminal may operate in a first lowered power mode 1006 where it monitors a sub-synchronous control channel (e.g., every 64 slots). This allows the client terminal to monitor only some slots (e.g., every N slots) instead of continuous monitoring of a control channel in suspend mode 1004, resulting in power savings for the access terminal. Because the data resume indicator (DRI) may be sent via the sub-synchronous control channel (e.g., every N slots), this may enable the client terminal to monitor only some slots (instead of continuously monitoring the control channel). For example, N may be 64 slots. As a result of monitoring only some of the slots in the control channel, the client terminal may achieve power savings. Consequently, the ability to save even a small amount of power in Active mode may translate to significant overall power savings and improve the operational time of client terminal, i.e., time between recharging.

Figure 17:
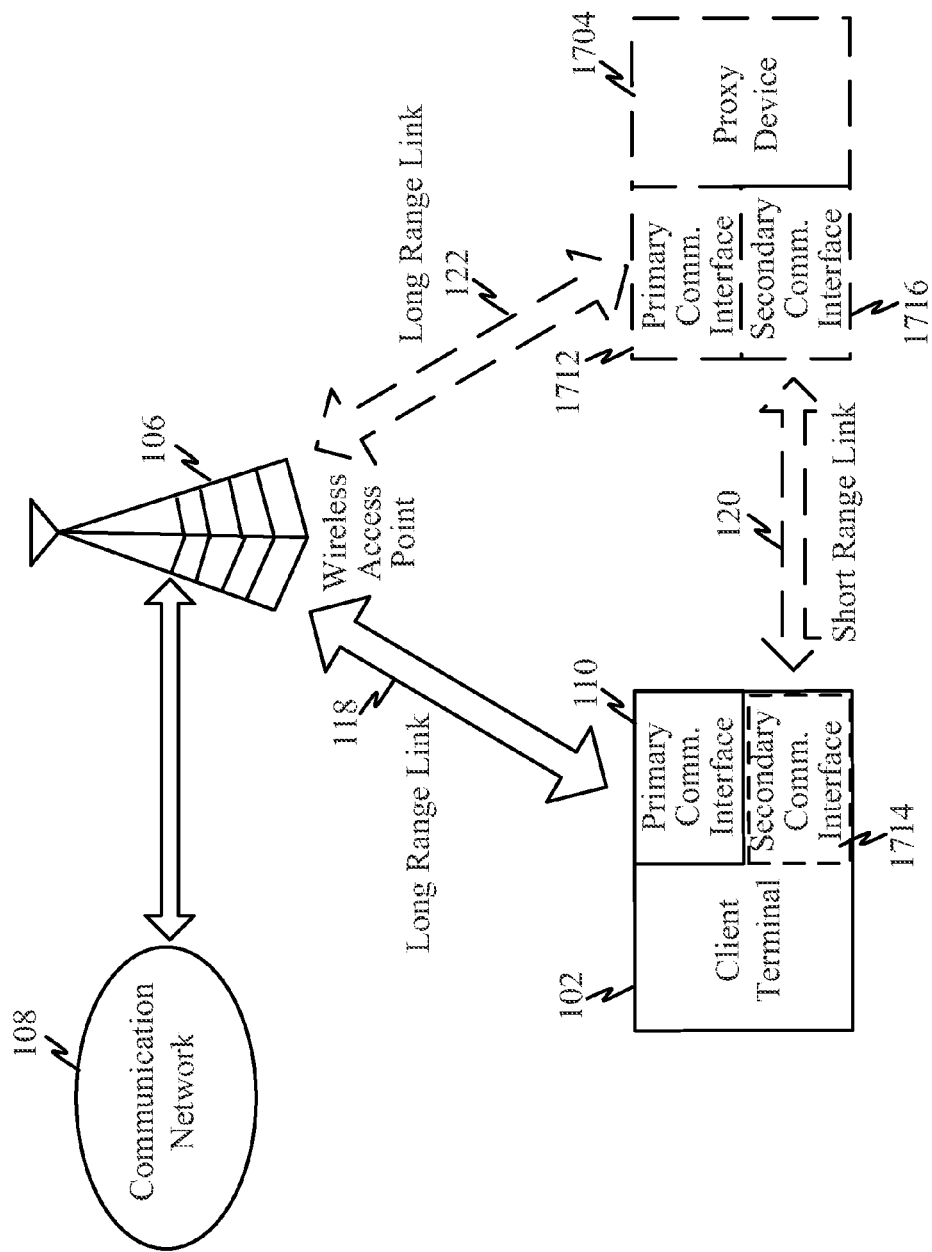
FIG. 17 illustrates an operating environment in which a proxy device may be present and configured to implement a data resume indicator to facilitate power conservation in a client terminal.

When a proxy device is available (i.e., proxy mode), the client terminal may operate in a second lowered power mode 1008 where it monitors an asynchronous control channel for a DRI capsule or message. Note that, without the assistance of a proxy device, the client terminal would have to continuously monitor the asynchronous control channel, therefore failing to achieve any significant power savings. However, as illustrated in FIG. 17, when a proxy device is available, the client terminal may assign the proxy device to monitor its channels on its behalf (including a control channel for incoming DRI capsules) while shutting off its primary interface. The client terminal then utilizes a low power, secondary communication interface to receive communications from the proxy device. Because monitoring of the asynchronous control channel is performed over the secondary communication interface (e.g., a low power communication interface relative to the primary communication interface), the client terminal may receive its DRI capsules while still achieving power conservation. Upon receipt of a DRI capsule over the secondary communication interface (via the asynchronous channel), the client terminal may power up its primary communication interface for reception of transmissions over the traffic channel.

Figure 11:
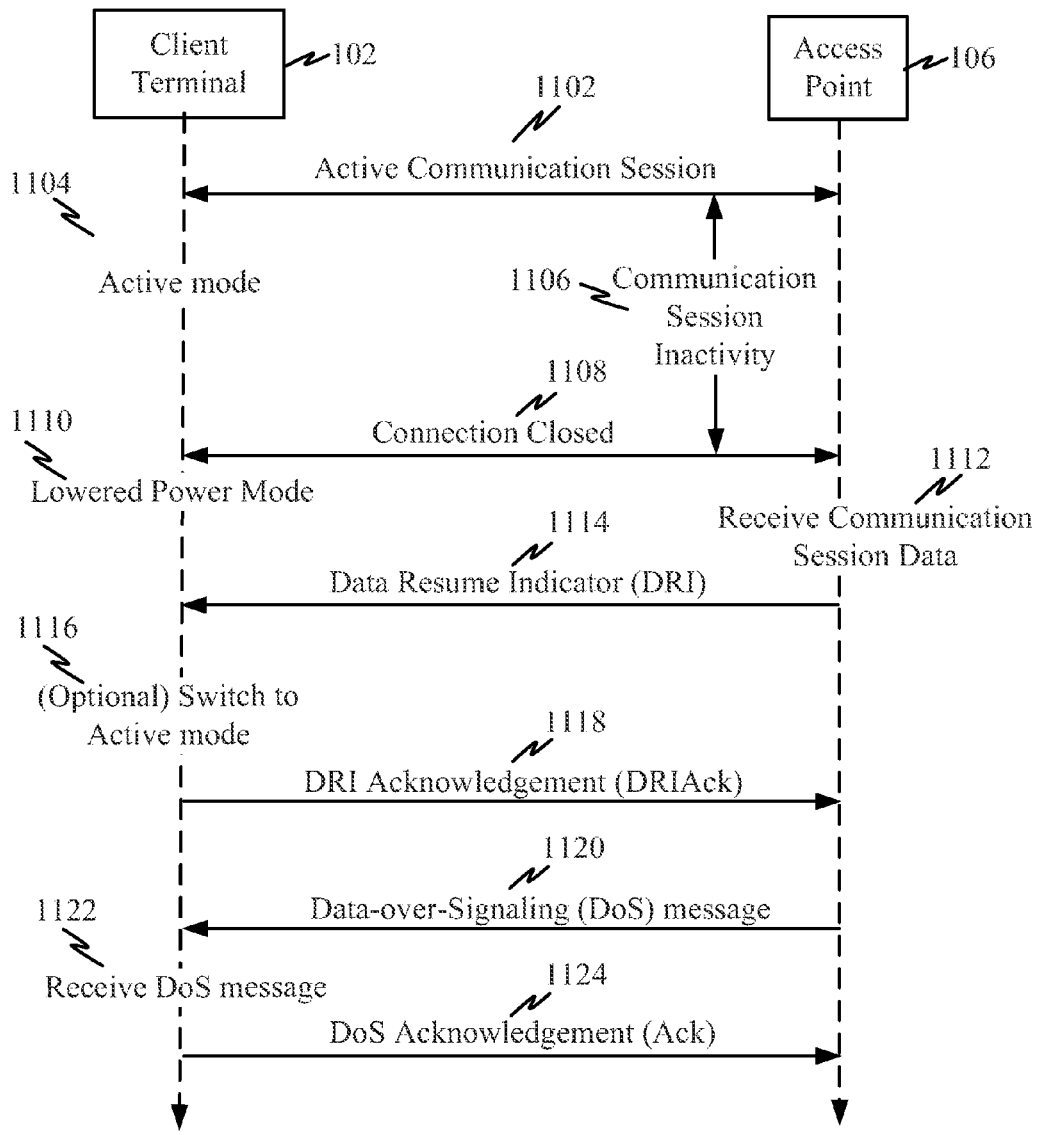
FIG. 11 is a block diagram illustrating the operation of a client terminal and an access point to achieve power conservation during an active communication session in an EV-DO communication system while using data-over-signaling.

FIG. 11 is a block diagram illustrating the operation of a client terminal and an access point to achieve power conservation during an active communication session in an EV-DO communication system while using data-over-signaling. In this example, data-over-signaling (DoS) is available such that a control channel can be used for transmission of the DRI and also transmission of the data. For example, if the lowered power mode allows the client terminal to monitor such control channel, then it may also be able to receive the data over such control channel (e.g., the control channel is used for small amounts of data where there is no need to reestablish the data channel for subsequent reception of additional data transfers). There may be an active communication session 1102 between the client terminal 102 and the access point 106. Due to communication session inactivity 1106 in the communication session (e.g., a short period of inactivity during the communication session), the connection may be closed 1108 for purposes of power savings. This may result in switching from the active 1104 to a lowered power mode 1110. Subsequently, the access point 106 may receive data for the communication session 1112. The access point 106 may then send a data resume indicator (DRI) 1114. Upon receipt of the DRI, the client terminal 102 may optionally switch to active 1116. That is, if the data is capable of being sent over the control channel (data-over-signaling) that is already being monitored in the lowered power mode, then the client terminal 102 may receive the data while in the lowered power mode (i.e., without having to switch back to either the active). The access point 106 may use the DRI message 1114 to also indicate whether it will be sending the data as a data-over-signaling message. The client terminal 102 may send a DRI acknowledgment 1118 to the access point 106 to indicate that it is ready to receive the data. Upon receipt of the DRI acknowledgement 1118, the access point 106 sends the data to the client terminal 102 using, for example, a data-over-signaling (DoS) message 1120 for short bursts of data. Upon receipt of the DoS message 1122, the client terminal 102 may send a DoS acknowledgement 1124 to the access point 106. This method may also be used when there is a large amount of data as setting up traffic channels may take some time. This method enables better user experience and when traffic channels are set up, the data is no longer carried over control channel as DoS messages.

Figure 12:
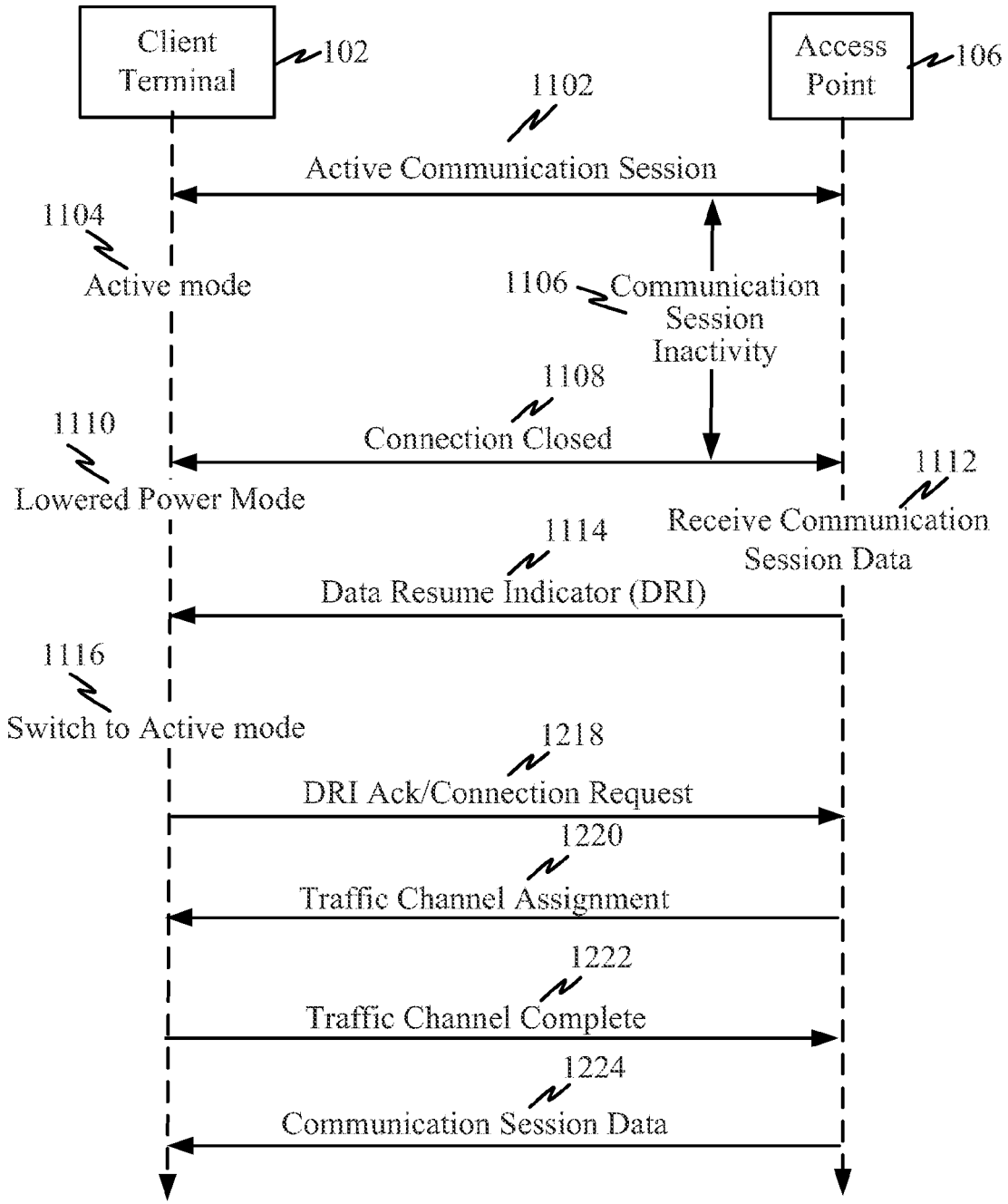
FIG. 12 is a block diagram illustrating the operation of a client terminal and an access point to achieve power conservation during an active communication session in an EV-DO communication system.

FIG. 12 is a block diagram illustrating the operation of a client terminal and an access point to achieve power conservation during an active communication session in an EV-DO communication system. In this example, data-over-signaling (DoS) is unavailable such that data transmissions occur over a data channel or traffic channels need to be established for data transfer even when initial data packets have been sent as DoS messages. As with FIG. 11, there may be an active communication session 1102 between the client terminal 102 and the access point 106 and the connection (e.g., data channel) between the client terminal 102 and access point 106 is closed due to inactivity. Upon the access point 106 receiving data 1112 for the client terminal 102, the access point 106 sends the data resume indicator 1116. Here, the client terminal 102 switches from the lowered power mode 1110 to the active mode 1116 in order to reestablish its data channel with the access point 106. Thus, the DRI acknowledgement may also include a connection request 1218. A traffic (data) channel assignment 1220 may then be sent by the access point 106 and acknowledged 1222 by the client terminal 102. The access point 106 may then send the communication session data 1224 to the client terminal 102 over the established traffic (data) channel.

Figure 13:
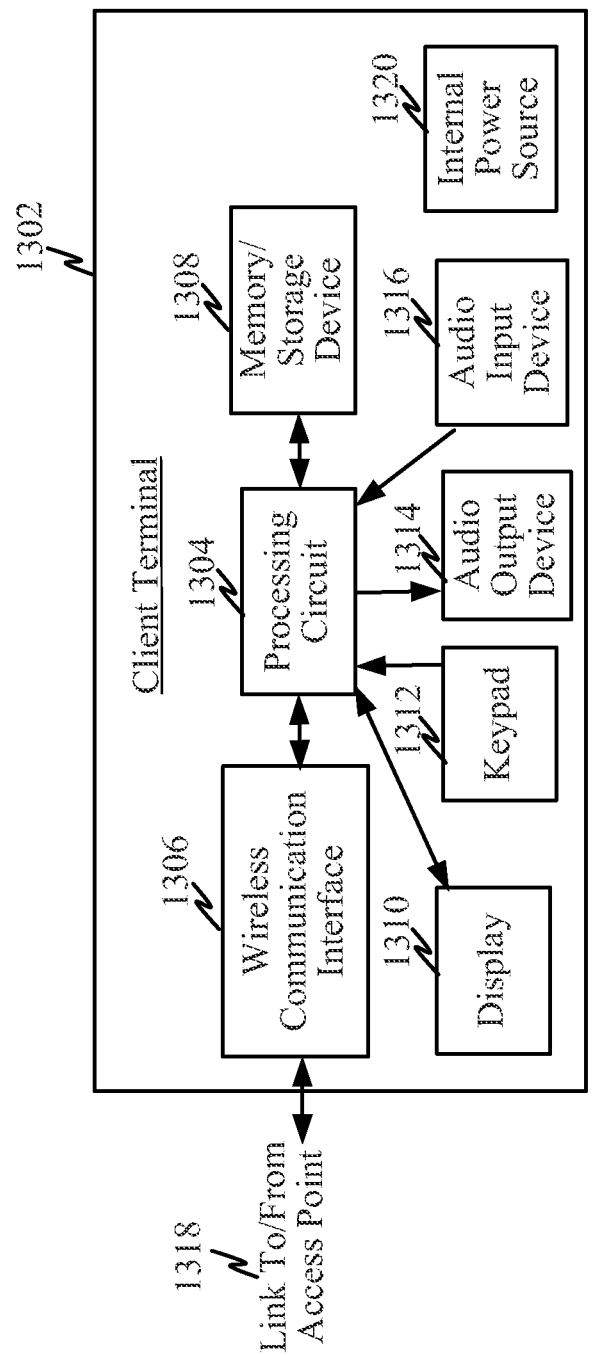
FIG. 13 is a block diagram of an example of a client terminal configured for power conservation during an active communication session by using a data resume indicator.

Exemplary Client Terminal with Lowered Power Mode During Active Communication Session FIG. 13 is a block diagram of an example of a client terminal configured for power conservation during an active communication session by using a data resume indicator. The client terminal 1302 may include a processing circuit 1304, such as a small and/or low-power microprocessor, coupled to a wireless communication interface 1306. The wireless communication circuit 1306 may include a transceiver, a transmitter, a receiver, and/or any other type of communication circuit or device suitable for wireless communications. The wireless communication interface 1306 allows the client terminal 1302 to communicate with devices on a wireless network, e.g., via a link to/from a network access point 1318. For example, the wireless communication interface 1306 may be compatible with UTMS and/or EV-DO networks. The processing circuit 1304 may also be coupled to a memory/storage device 1308 that stores data. Furthermore, the processing circuit 1304 may be further coupled to one or more input devices, such as a keypad 1312 and/or an audio input device 1316 (e.g., microphone), and one or more output devices, such as display 1310 and an audio output device 1314 (e.g., speaker). The client terminal 1302 may be powered by an internal power source 1320 (e.g., battery) and the amount of power such source can provide is limited.

The client terminal 1302 may be configured to achieve improved power savings by using a lowered power mode during periods of inactivity in a communication session via the link 1318 to/from a network access point. During the communication session (e.g., where the client terminal is receiving data messages, VoIP packets, video packets, etc.) there may be short periods of inactivity (e.g., where no data messages are received). Thus, the client terminal (e.g., through one or more of its components such as the processing circuit 1304 and wireless communication interface 1306) may be configured to switch between a connected mode, where the wireless communication interface 1306 is substantially, continuously, or fully monitoring a data or traffic channel (e.g., continuous monitoring), and a lowered power mode where at least a control channel is being discontinuously/periodically monitored for a data resume indicator (DRI). Note that during the lowered power mode the wireless communication interface 1306 may be monitoring or scanning the control channel more frequently than it would otherwise be monitored in a disconnected/inactive mode (e.g., idle mode or sleep mode). The operating mode or state of the client terminal (e.g., connected mode or lowered power mode) may be known to the access point with which the wireless communication interface 1306 communicates. This allows the access point to know whether it can send data messages via an established data/traffic channel to the client terminal 1302 or whether it should use a data resume indicator (DRI) to inform the client terminal 1302 prior to sending a data message as part of the communication session. In some instances (e.g., for short data bursts), the client terminal 1302 may receive the data message as a data-over-signaling message via the control channel while in the lowered-power mode (e.g., without the need to switch to a connected mode or setup a data/traffic channel). In other instances, upon receipt of the DRI, the client terminal 1302 may switch to a connected mode so that its wireless communication interface 1306 monitors a data/traffic channel for one or more data messages from the access point as part of its communication session. Note that the decision to switch from a connected mode to the lowered power mode may be made by the client terminal 1302 (upon noticing inactivity in its data/traffic channel) which then informs the access point of the operating mode change, or it may be made by the access point (upon noticing inactivity in the communication session data/traffic channel) which then instructs the client terminal to switch to the lowered power mode.

Figure 14:
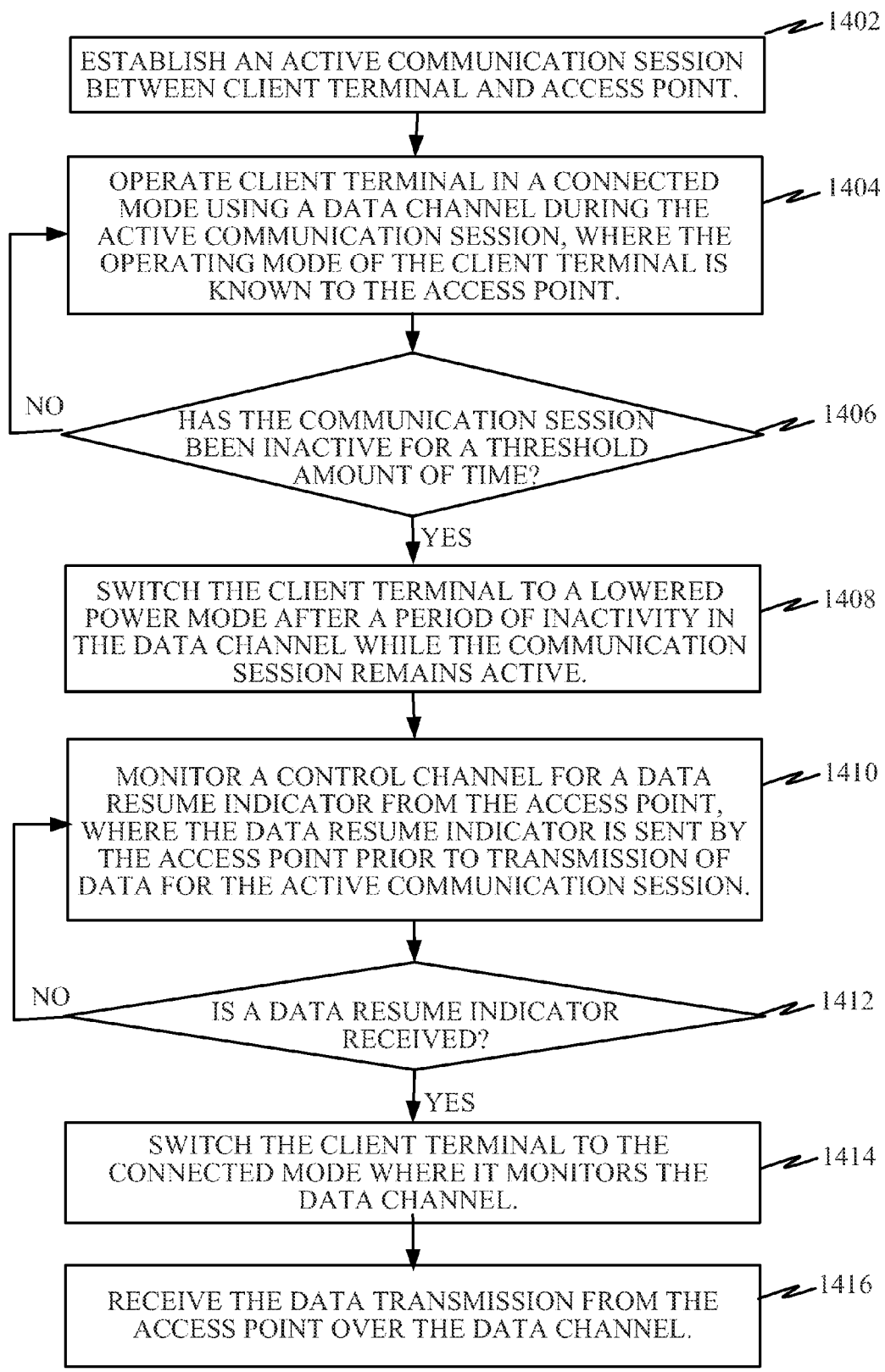
FIG. 14 illustrates a method operational in a client terminal for power conservation during an active communication session.

FIG. 14 illustrates a method operational in a client terminal for power conservation during an active communication session. The communication session may be established between the client terminal and an access point 1402. The client terminal may operate in a connected mode using a data channel during the communication session, where the operating mode of the client terminal is known to the access point 1404. After a period of inactivity in the data channel 1406 (inactivity for a threshold amount of time), the client terminal may be switched (from the connected mode) to a lowered power mode while the communication session remains active 1408. In the lowered power mode, the control channel may be monitored discontinuously and the data channel may not be monitored in order to conserve power. Thus, in the lowered power mode the client terminal consumes less power than in the connected mode. In one example, the wireless communication interface may determine that the period of inactivity has exceeded a threshold amount of time and then independently switches to the lowered power mode. Note that the threshold amount of time may be shorter than the amount of time which would normally trigger a switch from the connected mode to a typical power conservation/inactive mode for the client terminal. The client terminal may then send a message to the access point indicating that the client terminal is being switched to the lowered power mode. In an alternative implementation, the client terminal (e.g., the wireless communication interface) may receive a message from the access point causing it to switch to the lowered power mode.

In the lowered power mode, the client terminal may monitor a control channel for a data resume indicator from the access point, where the data resume indicator is sent by the access point prior to transmission of data for the communication session 1410. In one example, the data resume indicator and the data for the communication session are received at a fixed time offset, thereby allowing the client terminal time to switch from the lowered power mode to the connected mode. The fixed time offset may be predetermined or it may be communicated to the client terminal by the access point. In an alternative approach, the client terminal may send a data resume indicator acknowledgement to the access point in response to receipt of the data resume indicator, wherein the data for the communication session is only transmitted by the access point after receipt of the data resume indicator acknowledgement.

If a data resume indicator is received 1412 (over the control channel), the client terminal may switch to the connected mode where it monitors the data channel 1414. The client terminal may subsequently receive the data transmission from the access point over the data channel 1416.

In an alternative implementation, the client terminal may not need to switch to the connected mode as the data transmission may be received over the control channel while operating in the lowered power mode. This may occur, for example, where there is only a small amount of data to be transmitted and the control channel may be used for transmission (i.e., data-over-signaling). In this instance, if no change of operating modes is needed, the access point may immediately transmit the data to the client terminal over the control channel (e.g., after transmission of the data resume indicator).

In one example, the wireless communication interface may be compatible with a Universal Mobile Telecommunications System (UMTS) Wideband Code Division Multiple Access (W-CDMA) air interface standard and the connected mode may be one of a Radio Resource Control (RRC) Cell Dedicated Channel (CELL_DCH) mode or Cell Forward Access Channel (CELL_FACH) mode. For instance, the wireless communication interface may implement Evolved High-Speed Packet Access (HSPA+) and the control channel is a High Speed-Shared Control Channel (HS-SCCH).

In another example, the wireless communication interface may be compatible with an Evolution-Data Only (EV-DO) air interface standard and the connected mode may be an Active mode. For instance, the control channel may be a sub-synchronous control channel, enabling the client terminal to monitor only some control channel slots.

Figure 15:
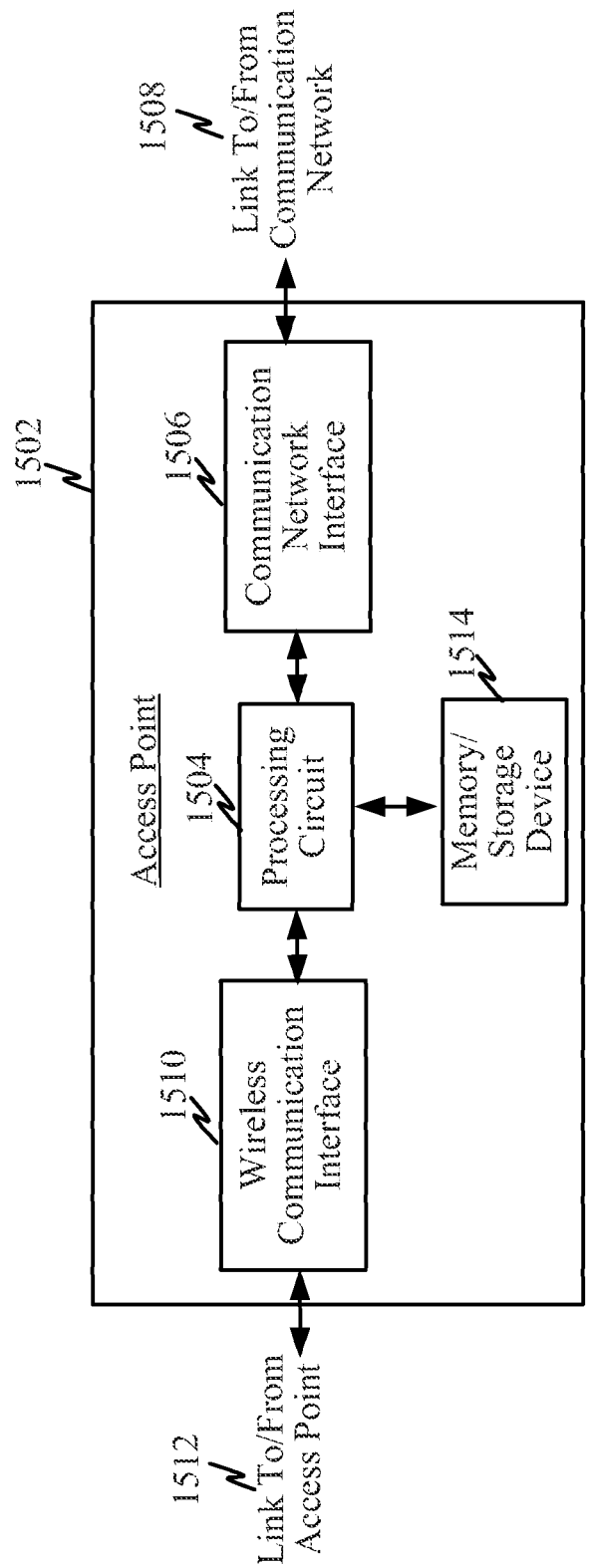
FIG. 15 is a block diagram of an example of an access point configured to facilitate power conservation in an access terminal during an active communication session by using a data resume indicator.

Exemplary Access Point Configured to Facilitate Lowered Power Mode in an Access Terminal During Active Communication Session FIG. 15 is a block diagram of an example of an access point configured to facilitate power conservation in an access terminal during an active communication session by using a data resume indicator. The access point 1502 may include a processing circuit 1504, coupled to a memory device 1514, a communication network interface 1506, and/or a wireless communication interface 1510. The communication network interface 1506 may permit the access point 1502 to communicate over a backhaul network using the link to/from communication network 1508, e.g., to facilitate communications over one or more networks and/or destination devices. The wireless communication circuit 1510 may include a transceiver, a transmitter, a receiver, and/or any other type of communication circuit or device suitable for wireless communications. The wireless communication interface 1510 allows the access point to communicate with one or more client terminals over a wireless network, e.g., via a link to/from a network access point 1512. The access point 1502 may have a communication session with a client terminal over a data channel. However, if there is a period of inactivity in the data channel (e.g., inactivity for longer than a threshold amount of time), the processing circuit 1504 may be adapted to either (a) receive an indication from the client terminal that it is switching from a connected mode to a lowered power mode or (b) send an indication to the client terminal to switch from the connected mode to the lowered power mode. Because the communication session is still active, the access point may maintain links and/or connections for the communication session alive. During the lowered power mode, the access point knows that the client terminal is not monitoring the data channel but the client terminal is instead discontinuously monitoring a control channel. Subsequently, if data is received (e.g., via the communication network interface 1506) for the communication session, then the access point 1502 may send a data resume indicator (DRI) over the control channel. After a time offset from sending the DRI, the access point may send the data over the data channel. Alternatively, where the amount of data is relatively small, the access point may simply send the data over the control channel (data-over-signaling). In yet another alternative, the access point 1502 may wait for an acknowledgement to the DRI from the client terminal prior to transmitting the data over the data channel.

Figure 16:
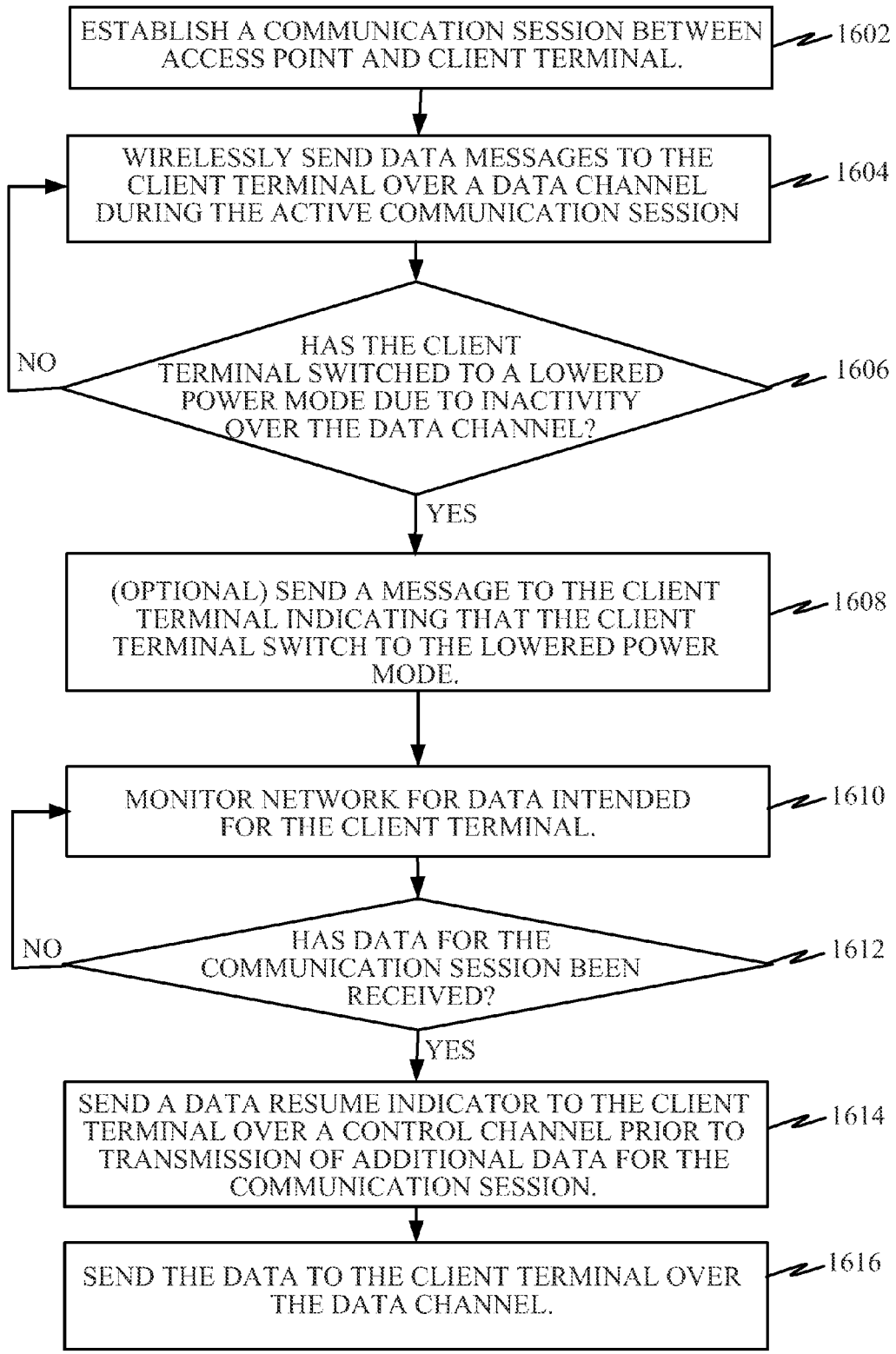
FIG. 16 illustrates a method operational in an access point for facilitating power conservation of a client terminal during a communication session.

FIG. 16 illustrates a method operational in an access point for facilitating power conservation at a client terminal during a communication session. A communication session may be established between the access point and an access terminal 1602. The access point may wirelessly send data messages to the client terminal over a data channel during the communication session 1604. The access point may then determine whether the client terminal has switched to a lowered power mode due to inactivity over the data channel 1606. According to a first optional feature, the access point may receive a message from the client terminal indicating that it is switching to the lowered power mode. Alternatively, according to as second optional feature, the access point may (a) determine that the data channel has been inactive for a threshold amount of time and consequently (b) sends a message to the client terminal indicating that the client terminal should switch to the lowered power mode 1608.

The access terminal may then monitor a network (e.g., communication network) for data intended for the client terminal 1610. If data for the communication session is received 1612, the access terminal sends a data resume indicator to the client terminal over a control channel prior to transmission of additional data for the communication session 1614. The access terminal then sends the data to the client terminal over the data channel after a fixed time offset from sending the data resume indicator 1616. For example, the data may be transmitted after a fixed amount of time from sending the data resume indicator. Alternatively, the data may only be sent after a data resume indicator acknowledgement is received by the access point from the client terminal. In some implementations, the data may be sent to the client terminal over a data channel. In other implementations, the data may send the data to the client terminal over the control channel (e.g., data-over-signaling).

Data Resume Indicator (DRI) with Proxy Device

FIG. 17 illustrates an operating environment in which a proxy device may be present and configured to implement a data resume indicator to facilitate power conservation in a client terminal. For instance, while the client terminal may switch from a connected mode to a lowered power mode (as previously described) to conserve power, additional power savings may be achieved with the assistance of a proxy device. That is, rather than discontinuously/periodically monitoring a control channel for a data resume indicator (via it primary communication interface 110) in the lowered power mode, the client terminal 102 may switch to a proxy mode where it powers down its primary communication interface 110 (e.g., enters a power conservation/inactivity mode). Instead, the client terminal 102 relies on the proxy device 1704 to monitor its control channel and/or data channel. Therefore, the client terminal 102 may achieve additional power savings over just operating in the lowered power mode.

In this implementation, the client terminal 102 may include a secondary communication interface 1714 that is used to communicate with the proxy device 1704. The proxy device 1704 may include a primary communication interface 1712 and a secondary communication interface 1716.

In one example, the client terminal 102 may request that a proxy device 1704 act as its proxy to monitor its data channel(s) for incoming data from the access point/network 106 while the client terminal 102 switches from a connected mode to a proxy mode (e.g., similar to a power conservation/inactive mode such as idle/sleep mode). In the proxy mode, the client terminal 102 may turn off its primary communication interface 110 to conserve power. Because the primary communication interface 110 is turned off, the client terminal 102 is no longer able to monitor and/or receive data from the access point 106. However, the proxy device 1704 monitors the control and/or data channel(s) on behalf of the client terminal 102 via its primary communication interface 1712. Note that the primary communication interfaces 110 and 1712 may be used for long range communication links 118 and 122 while the secondary communication interfaces 1714 and 1716 may be used for short range communication links 120.

According to one implementation, the access point 106 may believe that the client terminal 102 is operating at a lowered power mode even though it is operating in a proxy mode for power conservation (e.g., not monitoring either a control or data channel over the primary communication interface 110). That is, even though the client terminal 102 may have advertised to the access point 106 that it is operating in the lowered power mode, it may have subsequently entered into a proxy relationship with the proxy device 1704, where the client terminal 102 turns off its primary communication interface to conserve more power (e.g., does not monitor the data or control channels expected by the access point 106). Because the access point 106 still believes that the client terminal 102 is operating in the lowered power mode, the access point 106 may transmit a data resume indicator over a control channel prior to transmitting actual data for a communication session of the client terminal 102 over a data channel. In this instance, the proxy device 1704 receives the data resume indicator through the primary communication interface 1712 and sends it to the client terminal 102 over the secondary communication interface 1716. Upon receipt of the data resume indicator via its secondary communication interface 1714, the client terminal 102 may activate or power on its primary communication interface 110 in order to receive a data transmission over the data channel. In one example, the short range link 120 may include an asynchronous channel which is continuously monitored by the secondary communication interface 1714 of the client terminal 102 for incoming DRI notifications from the proxy device 1704.

In another implementation, the access point 106 may believe that the client terminal 102 is operating in a connected power mode even though it is operating in a proxy mode for power conservation (e.g., not monitoring either a control or data channel over the primary communication interface 110). That is, the client terminal 102 may not have informed the access point that it has switched to a proxy mode. Therefore, the access point 106 transmits data for the communication session of the client terminal 102 over the data channel without sending a data resume indicator first. However, the proxy device 1712 receives the data transmission from the access point 106 (e.g., via its primary communication interface 1712) and buffers it. Upon receipt of such data, the proxy device 1712 may send a data resume indicator to the client terminal over the secondary communication interface 1716. Thus, the proxy device is generating its own data resume indicator. Upon receipt of the data resume indicator at the client terminal 102 (via its secondary communication interface 1714), the client terminal 102 may switch to a connected mode where it can receive the data over the primary communication interface 110 from the proxy device 1704. Alternatively, the proxy device may send the data to the client terminal 102 over the secondary communication interface 1716.

Exemplary Proxy Device

Figure 18:
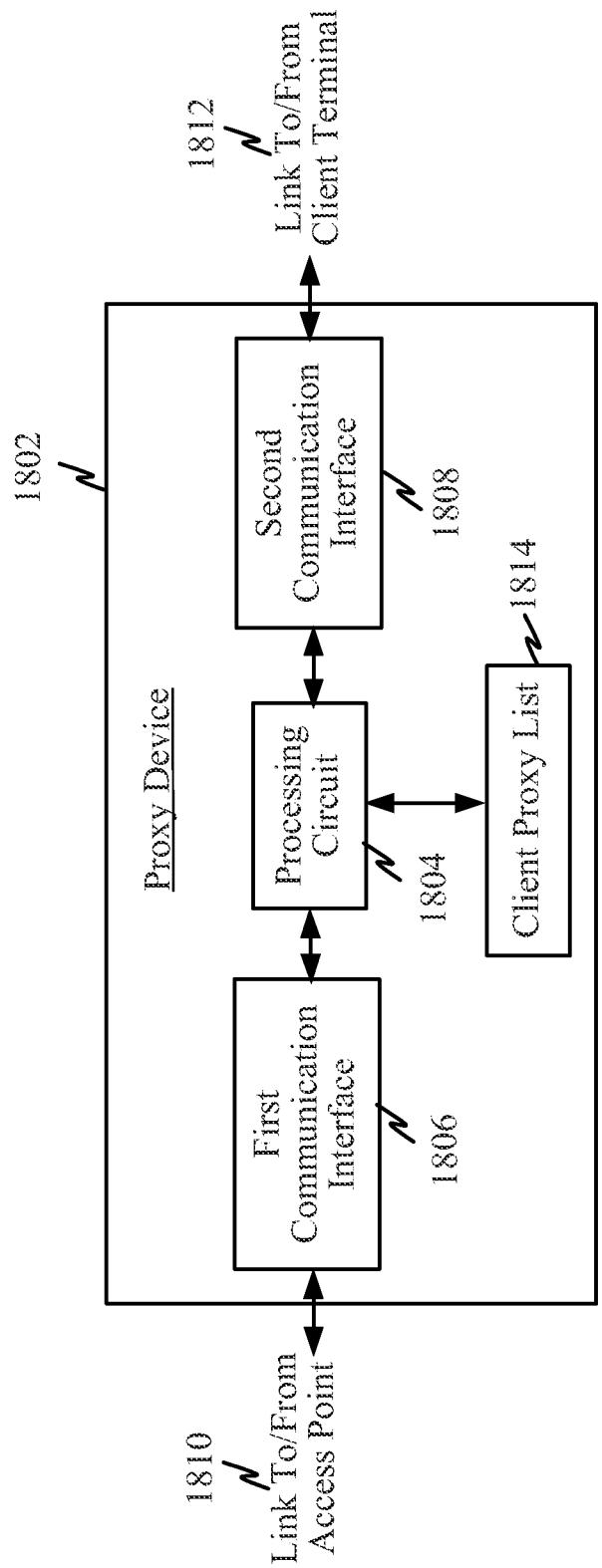
FIG. 18 is a block diagram of an example of a proxy device configured to act as a proxy for client terminals to facilitate power conservation in the client terminals.

FIG. 18 is a block diagram of an example of a proxy device configured to act as a proxy for client terminals to facilitate power conservation in the client terminals. The proxy device 1802 may include a processing circuit 1804, a primary communication interface 1806, and a secondary communication interface 1808. The primary communication interface 1806 communicatively couples the proxy device 1802 to an access point via a first wireless communication link 1810. For example, the primary communication interface 1806 may be a high power interface used for long range communications, such as over a CDMA-compliant network. The secondary communication interface 1808 may be used to couple the proxy device 1802 to a client terminal. For example, the secondary communication interface 1808 may be a lower power interface used for short range communications, such as over a Bluetooth-compliant network.

In one mode of operation, the proxy device 1802 may be configured to monitor data channels for client terminals identified on a client proxy list 1814 via its primary communication interface 1806. That is, the proxy device 1802 may have agreed to act as a proxy for one or more client terminals. The client proxy list 1814 may be maintained in memory by the processing circuit 1804 and shared with the primary and/or secondary communication interfaces 1806, 1808. In such proxy mode, the proxy device 1802 may use its primary communication interface 1806 to monitor the data channel(s) associated with the client terminals for which it agreed to act as a proxy. If a data resume indicator is received in a control and/or channel, the proxy device 1802 may send the data resume indicator through its second communication interface 1808 via a link to the corresponding client terminal 1812. In sending data resume indicator, the proxy device 1802 may translate it from a first protocol (associated with the primary communication interface 1806) to a second protocol (associated with the secondary communication interface 1808). After forwarding the data resume indicator, the proxy device may also forward one or more received data messages for the same client terminal.

Figure 19:
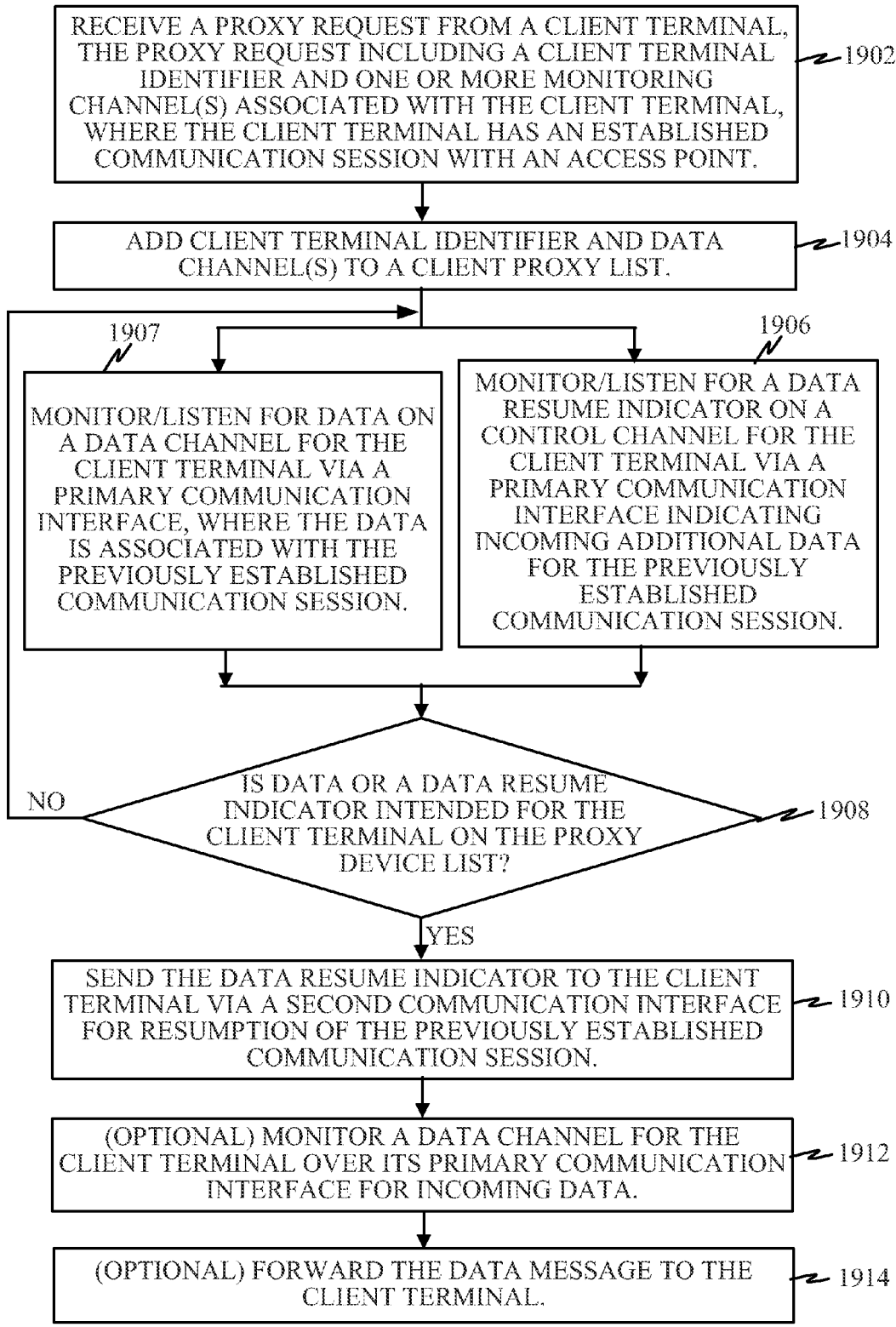
FIG. 19 is a flow diagram illustrating a method operational in a proxy device for facilitating power conservation in client terminals when their communication network supports DRI.

FIG. 19 is a flow diagram illustrating a method operational in a proxy device for facilitating power conservation in client terminals when their communication network supports DRI. A client terminal may have an ongoing or established communication session with an access point. Subsequently, the proxy device may receive a proxy request from the client terminal 1902. The proxy request may include a client terminal identifier and one or more data and/or control channel(s) associated with the client terminal. Note that, in one example, the proxy request may be received while the communication session is still active or alive. In one example, the proxy request may be received while the client terminal is operating in a lowered power mode. Such proxy request may be received over either the primary communication interface or the secondary communication interface of the proxy device. The client terminal identifier and one or more data and/or control channel(s) associated with the client terminal and the corresponding parameters for monitor those channels on behalf of the client terminal may then be added to a client proxy list on the proxy device 1904. Upon acceptance of its proxy request by the proxy device, the client terminal may switch to a power conservation mode where it no longer monitors a data and/or control channel for its communication session. In one embodiment, where the client terminal is already monitoring for a DRI due to inactivity, the client terminal may inform the proxy device that it is monitoring for the DRI so that the proxy device can take over DRI monitoring. In another embodiment, the proxy device may continuously monitor for a DRI for all associated client terminals and notify the appropriate terminal when it receives the DRI for a client terminal.

In one example, the proxy device may then monitor or listen for a data resume indicator on a control channel for the client terminal via a primary communication interface indicating incoming additional data for the previously established communication session 1906. In another example, the proxy device may also monitor or listen for data on a data channel for the client terminal via the primary communication interface, where the data is associated with the previously established communication session 1907.

The proxy device may determine if data or a data resume indicator is received and intended for a client terminal on the proxy list 1908. If no data or data resume indicator for the client terminals is received, the proxy device may continue to monitor or listen for the data and/or data resume indicator. If the proxy device receives data or a data resume indicator that is meant for the client terminal, the proxy device may send the data resume indicator to the client terminal via its secondary communication interface for resumption of the previously established communication 1910. The proxy device may then monitor a data channel for the client terminal over its primary communication interface for incoming data 1912. Upon receipt of data, the proxy device forwards the data to the client terminal 1914. For example, the data message may be forwarded either via the primary communication interface or via the secondary communication interface.

Note that the proxy device may assist the client terminal to achieve power conservation even if DRI is not available from the network. That is, the proxy device may monitor for incoming data on the data channel and buffer the data. The proxy device may then send the buffered data to the client terminal (with or without sending a prior DRI to the client terminal).

According to one feature, the proxy device may also receive a data resume indicator acknowledgment from the client terminal over the second communication interface. The proxy device may then transmit the data resume indicator acknowledgement to the access point via the first communication interface.

Figure 20:
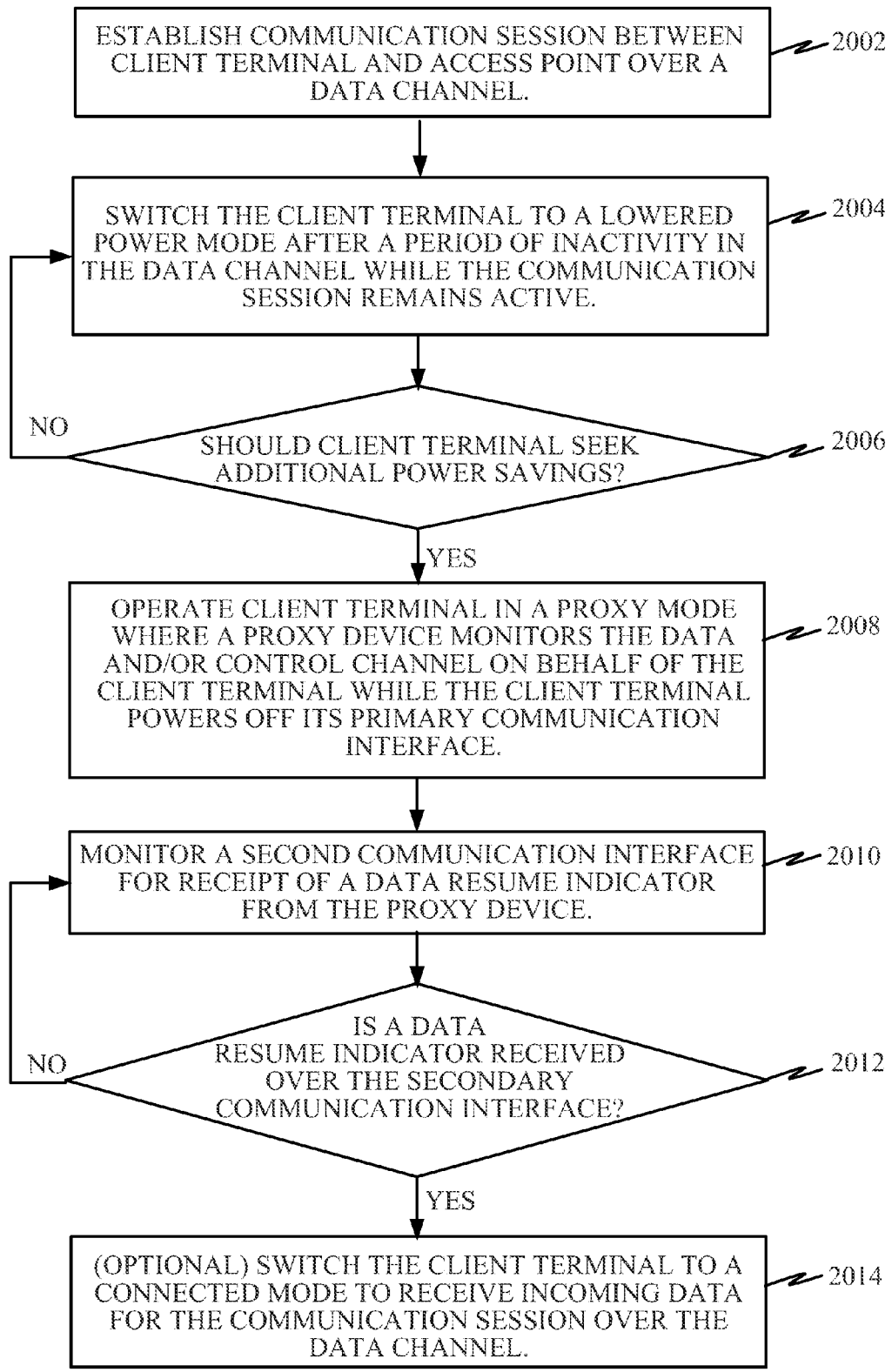
FIG. 20 is a flow diagram illustrating a method operational in a client terminal for power conservation using a data resume indicator and/or a proxy device.

FIG. 20 is a flow diagram illustrating a method operational in a client terminal for power conservation using a data resume indicator and/or a proxy device. This method may be similar to that illustrated in FIG. 14, but with the potential for additional power savings by using a proxy. The client terminal may have established a communication session with an access point over a data channel 2002 (e.g., via a primary communication interface for the client terminal). After a period of inactivity over its data channel, the client terminal may have entered into a lowered power mode, while the communication session is still active or alive 2004. Note that the access point has knowledge that the client terminal is now operating in the lowered power mode. Consequently, the access point may be configured to send a data resume indicator over a control channel prior to attempting transmission of additional data for the communication session over the data channel.

Subsequently, the client terminal may decide whether to switch from the lowered power mode to seek additional power savings 2006. Prior to switching from the lowered power mode, the client terminal may decide to enter into a proxy mode, where a proxy device monitors the data and/or control channel on behalf of the client terminal while the client terminal powers off its primary communication interface 2008. Thus, the proxy device now monitors the control channel for data resume indicators associated with the communication session of the client terminal. In turn, the client terminal may monitor a secondary communication interface for receipt of a data resume indicator from the proxy device 2010. If a data resume indicator is received by the proxy device over the secondary communication interface 2012, the client terminal may switch to a connected mode to receive incoming data for the communication session over the data channel 2014.

In an alternative implementation, the proxy device may decide whether the client terminal should wakeup from its proxy mode when a data resume indicator is received. If the expected amount of data is relatively small, the proxy device may simply buffer the data or send it over the secondary communication interface (e.g., without waking up the primary communication interface of the client terminal). Otherwise, if the expected amount of data is relatively large, the proxy device may send the data resume indicator to the client terminal so that the primary communication interface for the client terminal is activated (e.g., switched to a connected mode) so that the client terminal can receive the subsequent data over its data channel. If the client terminal activates its primary communication interface, the client terminal may reestablish a connection, i.e. resume a previously established communication session, with the access point via the primary communication interface.

Exemplary Femto Access Point with Integrated Proxy Device

In some implementations, the functionality of a proxy device may be integrated into a client terminal or an access point. For instance, an access point may have both a primary communication interface, which is normally used to communicate with the terminals being served, and a secondary communication interface compatible with the secondary communication interfaces for the client terminals being served. In this particular configuration, since the secondary communication interface is located on the access point (which typically has a plentiful power supply), it may be able to boost the operating transmission range of its secondary communication interface beyond the typical transmission range of such communication interfaces. In this manner, an access point may be able to forward data messages over its secondary communication interface to the corresponding secondary communication interfaces of served client terminals that have shut off their primary communication interfaces.

A femtocell may buffer data for the client terminal and send a data resume indicator using its secondary communication interface which the client terminal is monitoring. The client terminal may be monitoring the secondary communication interface over a wireless link or an out-of-bound radio, such as Bluetooth, for lower power consumption. The actual data may be sent after an offset (either fixed or configurable) that allows sufficient time for the client terminal to come out of lowered power mode and establish data/traffic channels for its active/live communication session. For smaller amounts of data, the data may also be sent as a Data Over Signaling (DoS) message from the femtocell to the client terminal.

Figure 21:
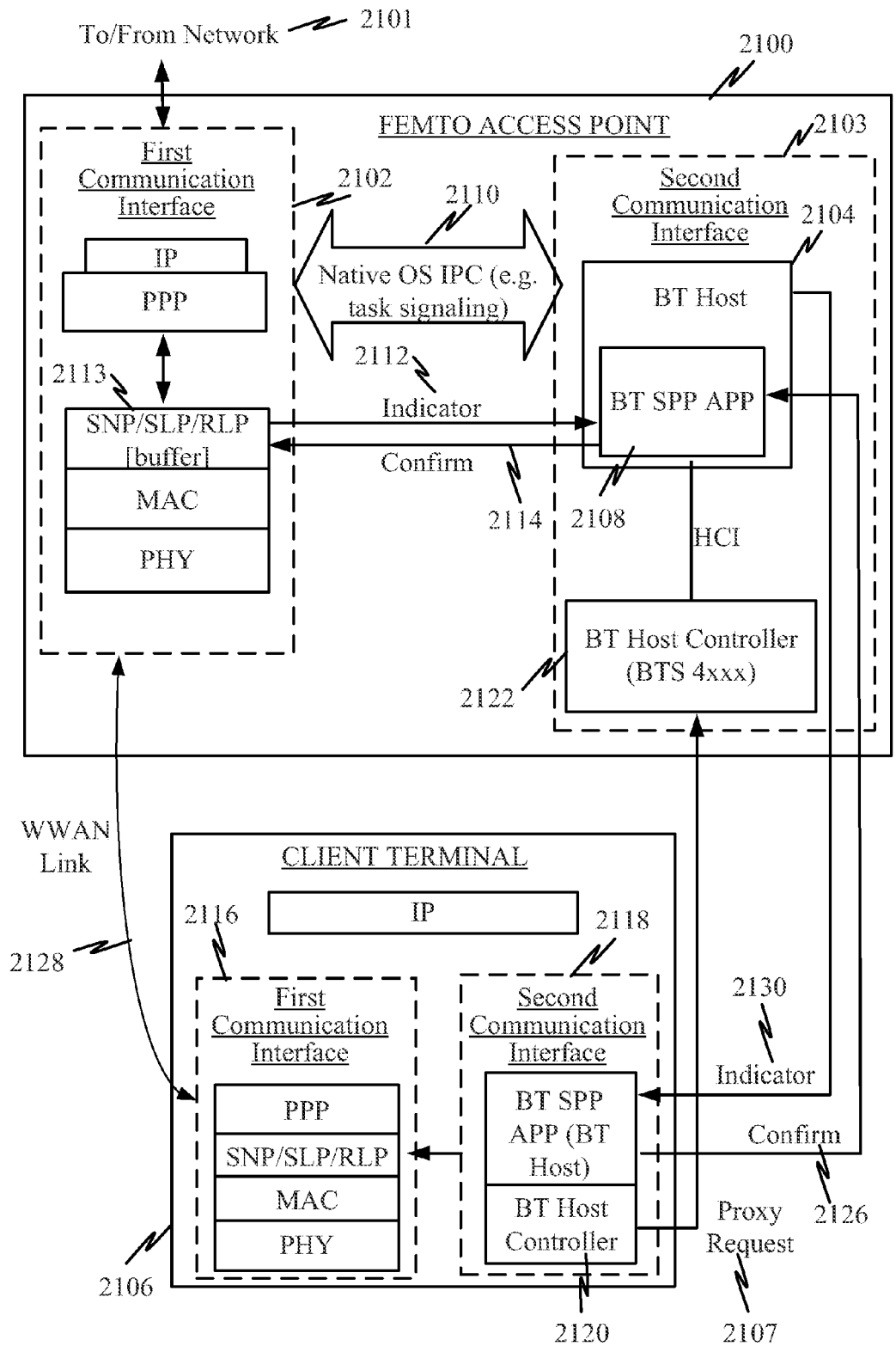
FIG. 21 is a block diagram illustrating an example of a femto access point that integrates a proxy device functionality to operate as a proxy for client terminals and thereby facilitate power conservation in the client terminals using CDMA 1x Evolution-Data Only (EV-DO).

Exemplary Femto Access Point (EV-DO)—FIG. 21 is a block diagram illustrating an example of a femto access point that integrates a proxy device functionality to operate as a proxy for client terminals and thereby facilitate power conservation in the client terminals using CDMA 1x Evolution-Data Only (EV-DO). A femto access point is a small cellular base station, typically designed for use in a home or small business. The femto access point 2100 may be used to connect one or more client terminals 2106 to/from a service provider network 2101 (e.g., via a broadband connection such as DSL or cable). The femtocell 2100 may include a first communication interface/circuit 2102 and a second communication interface/circuit 2103. The first communication interface/circuit 2102 may be compliant with an EV-DO architecture, i.e. includes a protocol stack having a physical layer (PHY), a MAC layer, a signaling protocol layer (to carry signaling messages between the network and the client terminal) which may buffer the data, a Point-to-Point Protocol (PPP) and Internet Protocol Layer. The signaling protocol layer and/or link layer may include a Signaling Network Protocol (SNP), a Signaling Link Protocol (SLP) and/or a Radio Link Protocol (RLP).

The first communication interface 2102 may be coupled to the second communication interface 2103. The second communication interface 2103 may include a host circuit 2104, such as a Bluetooth host circuit, allowing the femto access point 2100 to communicate with a client terminal 2106. A native operating system (OS) Inter-process communication (IPC) 2110 may be used for exchanging data and task signaling between the first communication interface 2102 and the second communication interface 2103. The host 2104 may include a low power interface, such as a Bluetooth serial port profile (SPP) application (APP) 2108.

The client terminal 2106 may include first communication interface 2116 including a protocol stack having a physical layer (PHY), a MAC layer, a signaling protocol layer and/or link layer (including Signaling Network Protocol (SNP)/Signaling Link Protocol (SLP)/Radio Link Protocol (RLP)), a Point-to-Point Protocol (PPP) and Internet Protocol Layer. The client terminal may also include a second communication interface 2118 including a low power interface, such as a Bluetooth (BT) serial port profile (SPP) application (APP), which may be controlled by a Bluetooth (BT) Host Controller 2120. The first and second communication interfaces may be in communication with each other.

When the client terminal 2106 wishes to conserve power, its second communication interface 2118 (e.g., the BT host controller 2120) may send a proxy request 2107 to the second communication interface 2103 of the femto access point 2100 (e.g., via the BT host controller 2122), requesting the femto access point 2100 to operate as its proxy by sending its data channel(s) and/or client ID. Using the client ID, the proxy femto access point 2100 may then add the client ID of the client terminal 2106 to its proxy list and send an acknowledgement to the client terminal 2106 to acknowledge receipt of the information. After receiving the acknowledgement, the client terminal 2106 may switch its first communication interface 2116 (e.g., WWAN interface) from a connected mode to a power conservation mode (e.g., idle, sleep, or off state). The femto access point 2100 now knows that the first communication interface 2116 is shut down and that the client terminal 2106 should be contacted via the second communication interface 2118.

Subsequently, data intended for the client terminal 2106 may be received at the first communication interface 2102 from the network 2101. Because the client terminal 2106 has shut down it first communication interface 2116, the access point 2100 knows that it needs to send an indicator 2112 prior to transmission of the data via its first communication interface 2102. Upon receipt of data for the client terminal 2106 (e.g., for an active communication session of the client terminal), the femto access point 2100 may send or forward the indicator 2130 via the second communication interface 2103. The client terminal 2106 may receive the indicator 2130 via its second communication interface 2118 (e.g., a low power interface) from the proxy femto access point 2100.

In one example, the first communication interface 2102 may implement a signaling protocol layer 2113 which buffers control signals. Upon receiving data for the client terminal 2106, an indicator 2112 may be sent to the second communication interface 2103 which may forward the indicator 2130 to the client terminal to the first communication interface 2102. Upon receiving the indicator 2130, the client terminal 2106 may switch its first communication interface 2116 from a low power state (e.g., idle or off state) to a high power state (e.g., active state) and sends a confirmation message 2126 back to the second communication interface 2103. The second communication interface 2103 at the femto access point 2100 may then forward the confirmation message 2114 to the first communication interface 2102. Upon receipt of the confirmation message 2114, the first communication interface 2102 may send/broadcast the data to the client terminal 2106. The client terminal 2106 receives the data via its first communication interface 2116 and may send an acknowledgement to the femto access point 2100. Thereafter, the client terminal 2106 may continue to receive data from the access point 2100 via its first communication interface 2128.

Figure 22:
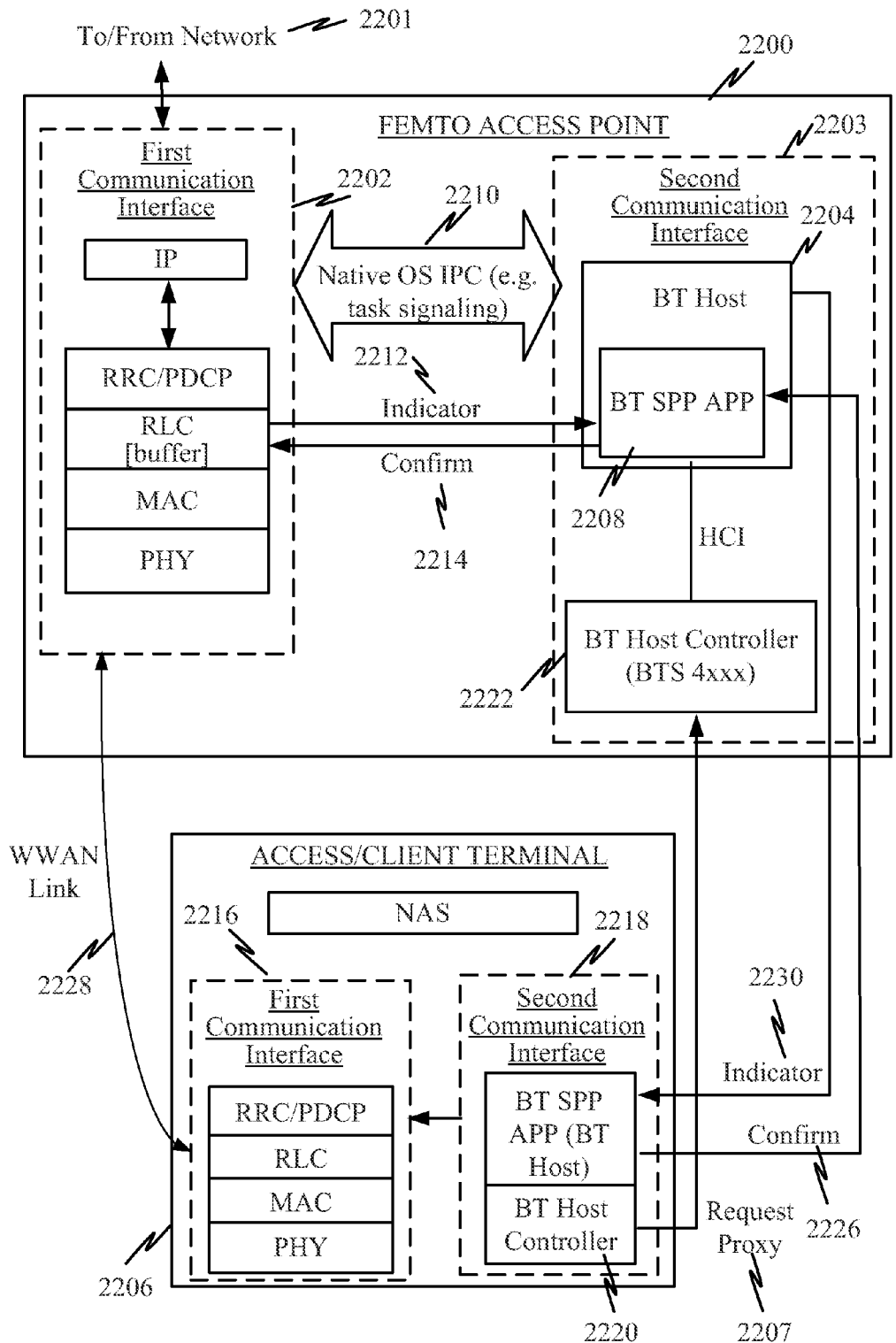
FIG. 22 is a block diagram of an example of a femto access point that integrates a proxy device functionality to operate as a proxy for client terminals and thereby facilitate power conservation in the client terminals using Universal Mobile Telecommunications System (UMTS).

Exemplary Femto Access Point (UMTS)—FIG. 22 is a block diagram of an example of a femto access point 2200 that integrates a proxy device functionality to operate as a proxy for client terminals and thereby facilitate power conservation in the client terminals using Universal Mobile Telecommunications System (UMTS). The femto access point 2200 may incorporate the functionality of a base station but extends it to allow a simpler, self contained deployment; an example is a UMTS femtocell containing a Node B and/or a Radio Network Controller (RNC) with Ethernet for backhaul communications. Although some examples may focus on Wideband Code Division Multiple Access (WCDMA) implementations, the concepts and features described herein may be applied to all communication standards, including Global System for Mobile Communications (GSM), CDMA2000 (also known as 1 xRTT), Time Division Synchronous Code Division Multiple Access (TD-SCDMA), Worldwide Interoperability for Microwave Access (WiMAX) and 3GPP Long Term Evolution (LTE).

The femto access point 2200 may include a first communication interface/circuit 2202 coupled to a second communication interface/circuit 2203. The first communication interface/circuit 2202 may be compliant with a UMTS architecture, i.e. includes a protocol stack having a physical layer (PHY), a MAC layer, a Radio Link Control (RLC) layer which may buffer the data, a Radio Resource Control (RRC) (used by the signaling path)/Packet Data Convergence Protocol (PDCP) (used by the data path) which define various modes of operation and an Internet Protocol (IP) Layer. The first communication interface 2202 of the femto access point 2200 may be configured to send/receive communications to/from a service provider network 2201.

The second communication interface 2203 may include host circuit 2204, such as a Bluetooth host, allowing the femto access point 2200 to communicate with a client terminal 2206. A native operating system (OS) Inter-process communication (IPC) 2210 may be used for exchanging data and task signaling between the first communication interface 2202 and the second communication interface 2203. The host circuit 2204 may include a low power interface, such as a Bluetooth serial port profile (SPP) application (APP) 2208.

The client terminal 2206 may include a first communication interface 2216 including a protocol stack 2216 having a physical layer (PHY), a MAC layer, Radio Link Control (RLC) protocol, Radio Resource Control (RRC)-Packet Data Convergence Protocol (PDCP) and Non Access Stratum (NAS). The client terminal 2206 may also include a second communication interface 2218 including a low power interface, such as a Bluetooth serial port profile (SPP) application (APP). The low power interface may be controlled by a Bluetooth (BT) Host Controller 2220.

When the client terminal 2206 wishes to conserve power, the second communication interface 2218 (e.g., via host controller 2220) may send a proxy request 2207 to the second communication interface 2222 of the femto access point 2200 (e.g., via host controller 2222), to operate as its proxy by sending its data channel(s) and client ID. As discussed above with reference to FIG. 21, using the client ID, the femto access point 2200 may then add the client ID of the client terminal to its proxy list and send an acknowledgement to the client terminal 2206. After receiving the acknowledgement, the client terminal 2206 may switch its first communication interface 2216 from a connected mode to a proxy mode. Thereafter, the client terminal 2206 may use its second communication interface 2218 (e.g., a lower power interface) to receive an indicator 2230 from the femto access point 2204 when data is available to be transmitted from the femto access point 2200.

In one example, the femto access point 2200 may receive data intended for the client terminal 2206 at the first communication interface 2202 (e.g., to the RLC layer) which buffers the page, control signal or data. Upon receiving the data, the first communication interface 2202 (e.g., from the RLC layer) may send an indicator 2212 to the second communication interface 2203 which may send/forward the indicator 2230 to the client terminal 2206 (via the second communication interface 2218). The indicator 2230 may embed a data resume indicator. Upon receiving the indicator 2230, the client terminal 2206 may switch its first communication interface 2216 (e.g., a wireless wide area network) from a power conservation mode to a connected mode and send a confirmation message 2226 back to the second communication interface 2203 of the femto access point 2200. The second communication interface 2203 may then forward the confirmation message 2214 to the first communication interface 2202. Upon receipt of the of the confirmation message 2214, the first communication interface 2202 may send/broadcast the data to the client terminal 2206 via the first communication interface 2202. The client terminal 2206 receives data through its first communication interface 2216 and may send an acknowledgement to the femto access point 2200. Thereafter, the client terminal 2206 may begin/continue to receive data from the access point 2200 via the network link 2228.

Figure 23A:
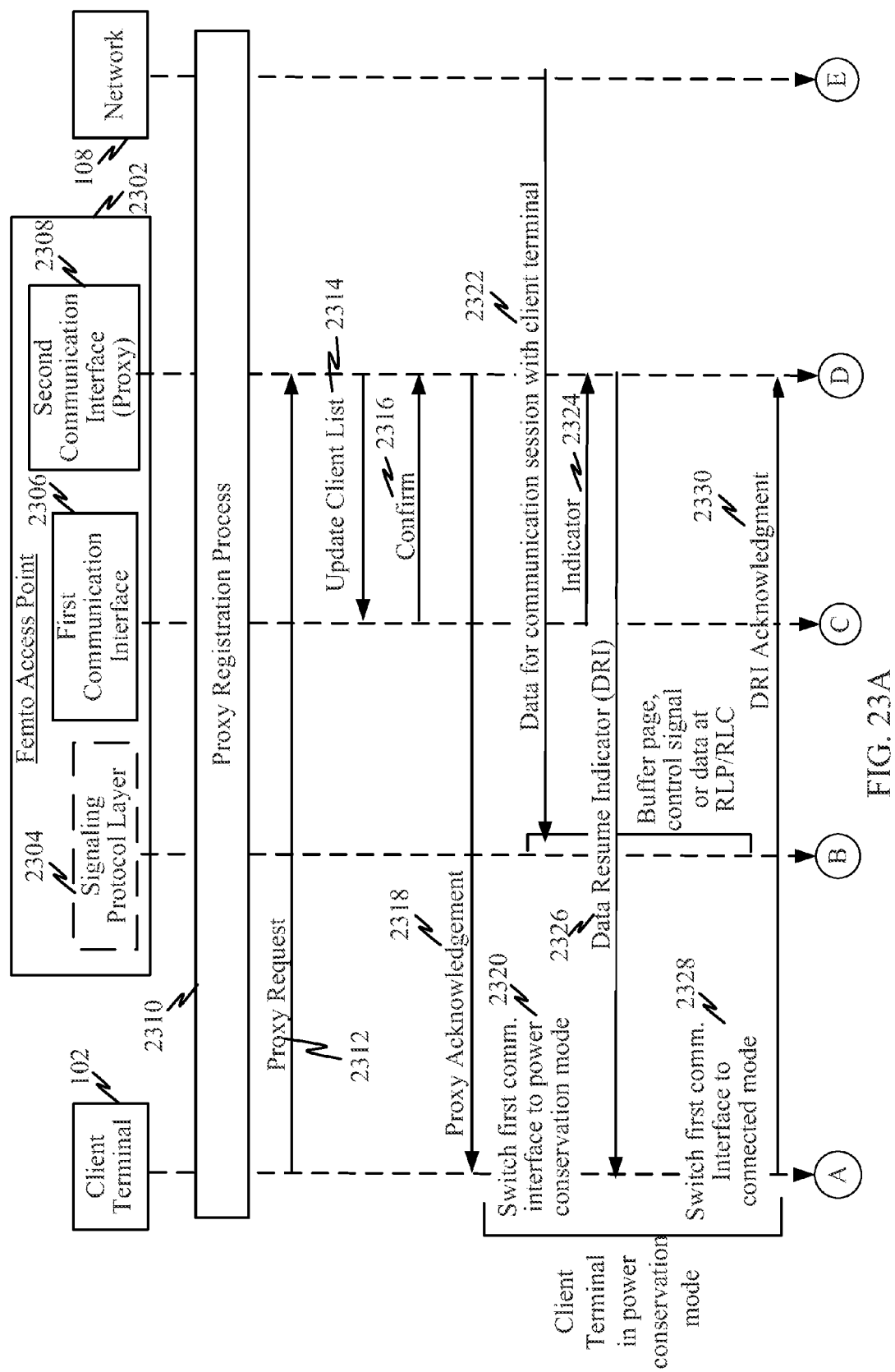
FIG. 23 (comprising FIGS. 23A and 23B) is a flow diagram illustrating the operation of a wireless communication system in which a femto access point with proxy functionality facilitates power conservation in client terminals by using a data resume indicator.
Figure 23B:
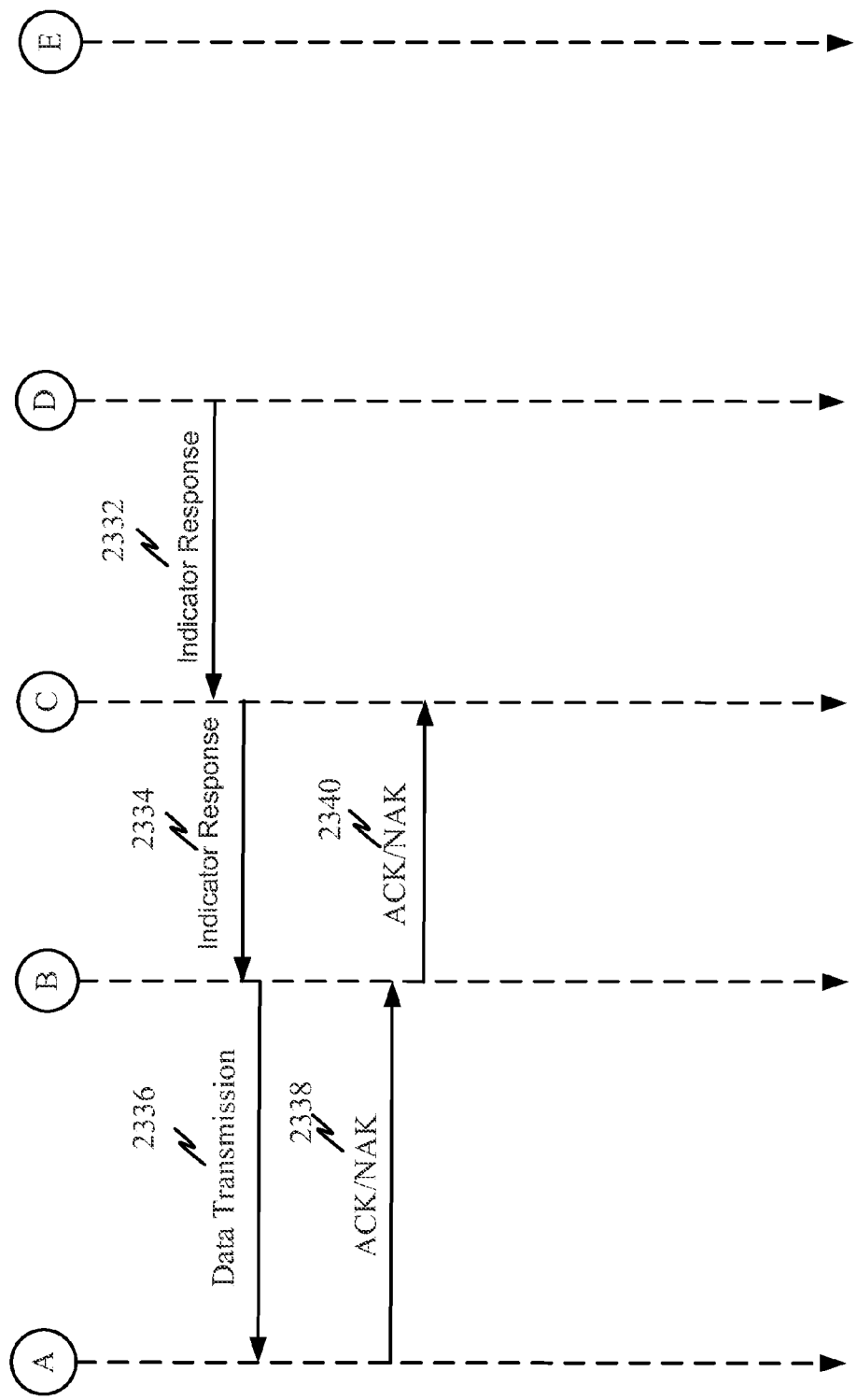

FIG. 23 (comprising FIGS. 23A and 23B) is a flow diagram illustrating the operation of a wireless communication system in which a femto access point with proxy functionality facilitates power conservation in client terminals by using a data resume indicator. In this example, the client terminal 102 and network 108 of FIG. 1 are used for illustration purposes. A femto access point 2302 may include a first communication interface 2306 and a second communication interface 2308. The first communication interface 2306 may implement a protocol stack which may include a signaling protocol layer 2304.

To facilitate power conservation in the client terminal 102, the femto access point 2302 and client terminal 102 may perform a proxy registration process 2310 in which the femto access point 2302 agrees to act as a proxy for the client terminal 102. The registration process 2310 may include the client terminal 102 sending a Client Identifier (ID) and/or data channel information to the femto cell access point 2302. The femto access point 2302 may maintain a client proxy list of the client identifiers and data channels of the client terminals for which the femto access point 2302 is acting as a proxy. That is, the client terminal 102 may register with the femto access point 2302.

When the client terminal 102 wishes to conserve power, it may send a proxy request 2312 to the second communication interface 2308 requesting the femto access point 2302 to operate as its proxy by sending its data channel(s) and client ID. Using the client ID, the femto access point 2302 may then update its client list by adding the identifier of the client terminal 102 to the client list stored in the higher layers of the first communication interface 2314. The first communication interface 2306 may then send a confirmation message 2316 to the second communication interface 2308 to acknowledge or confirm receipt of updated client list 2316. Upon receipt of the confirmation message 2316 from the first communication interface 2306, the second communication interface 2308 may then send a proxy acknowledgement 2318 to the client terminal 102. After receiving the proxy acknowledgement 2318, the client terminal 102 may switch its first communication interface (e.g., wireless wide area network (WWAN) interface) to a power conservation/inactive mode 2320.

Subsequently, the femto access point 2322 may receive data (e.g., for an established communication session with the client terminal) from the network 108 and intended for the client terminal 102. Upon receipt of the data, the first communication interface 2306 may send an indicator 2324 to the second communication interface 2308. The indicator 2324 may include a data resume indicator intended for a client terminal 102. The second communication interface 2308 may then ascertain whether the indicator 2324 is intended for a client terminal in the proxy client list. If the indicator 2324 is intended for a client terminal on the proxy client list, the second communication interface 2308 may then send a data resume indicator 2326 to the specified client terminal 102. The client terminal 102 may receive the data resume indicator 2326 via its own second communication interface. Upon reception of the data resume indicator (DRI) 2326, the client terminal 102 may determine whether it should activate its first communication interface, i.e. activate its WWAN interface, to a connected mode 2328.

Next, a response to notification of a DRI Acknowledgment 2330 may be sent by the client terminal 102 to the second communication interface 2308 in the femto access point 2302. The second communication interface 2308 may then send an indicator response 2332 to the first communication interface 2306 which in turn sends a response 2334 to the signaling protocol layer 2304. Upon receipt of the response 2334 (and possibly after a time offset identified in the data resume indicator 2326), the signaling protocol layer 2304 may then transmit the data 2336 to the client terminal 102 via the first communication interface 2306 (e.g., WWAN interface). An acknowledgement 2338 of receipt of the data transmission may be sent by the client terminal 102 to the signaling protocol layer 2304 which in turn may forward the acknowledgement 2340 to the first communication interface 2306.

One or more of the components, steps, features and/or functions illustrated in FIGS. 1, 2, 3, 4, 5, 6, 7, 8, 9, 10, 11, 12, 13, 14, 15, 16, 17, 28, 19, 20, 21, 22, and/or 23 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 13, 15, 17, 18, 21 and/or 22 may be configured to perform one or more of the methods, features, or steps described in FIGS. 2-12, 14, 16, 19-20, and/or 23. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A client terminal comprising:
   a wireless communication interface for wirelessly communicating with an access point; and
   a processing circuit coupled to the wireless communication interface and adapted to receive data messages via the wireless communication interface during a communication session, the wireless communication interface configured to
   operate in a connected mode using a data channel during the communication session, where the operating mode of the client terminal is known to the access point;
   switch to a lowered power mode after a period of inactivity in the data channel while the communication session remains active;
   monitor a control channel for a data resume indicator from the access point, where the data resume indicator is sent by the access point prior to transmission of data for the communication session; and
   receive data from the access point in the lowered power mode over the control channel when the data is of a first size, otherwise switch to the connected mode prior to receiving the data from the access point over the data channel when the data is of a second size, wherein the second size is larger than the first size.

2. The client terminal of claim 1, wherein the wireless communication interface is further configured to:
   switch to the connected mode upon receipt of the data resume indicator; and
   monitor the data channel for the data transmission from the access point.

3. The client terminal of claim 2, wherein the wireless communication interface is further configured to:
   receive the data transmission from the access point over the data channel.

4. The client terminal of claim 1, wherein the wireless communication interface is further configured to:
   receive the data transmission over the control channel while operating in the lowered power mode.

5. The client terminal of claim 1, wherein the data for the communication session is received at a fixed time offset from the reception of the data resume indicator.

6. The client terminal of claim 1, wherein the wireless communication interface is further configured to:
   in the connected mode, send a data resume indicator acknowledgement to the access point in response, wherein the data for the communication session is only transmitted by the access point after receipt of the data resume indicator acknowledgement.

7. The client terminal of claim 1, wherein the lowered power mode the control channel is monitored discontinuously and the data channel is not monitored to conserve power.

8. The client terminal of claim 1, wherein the lowered power mode the client terminal consumes less power than the connected mode.

9. The client terminal of claim 1, wherein the wireless communication interface is compatible with a Universal Mobile Telecommunications System (UMTS) Wideband Code Division Multiple Access (W-CDMA) air interface standard and the connected mode is one of a Radio Resource Control (RRC) Cell Dedicated Channel (CELL_DCH) mode or Cell Forward Access Channel (CELL_FACH) mode.

10. The client terminal of claim 9, wherein the wireless communication interface implements Evolved High-Speed Packet Access (HSPA+) and the control channel is a High Speed-Shared Control Channel (HS-SCCH).

11. The client terminal of claim 1, wherein the wireless communication interface is compatible with an Evolution-Data Only (EV-DO) air interface standard and the connected mode is an Active mode.

12. The client terminal of claim 11, wherein the control channel is a sub-synchronous control channel, enabling the client terminal to monitor only some control channel slots.

13. The client terminal of claim 1, wherein the wireless communication interface determines that the period of inactivity has exceed a threshold amount of time and independently switches to the lowered power mode.

14. The client terminal of claim 1, wherein the wireless communication interface is further configured to:
send a message to the access point indicating that the client terminal is being switched to the lowered power mode.

15. The client terminal of claim 1, wherein the wireless communication interface is further configured to:
receive a message from the access point causing the client terminal to switch to the lowered power mode.

16. The client terminal of claim 1, further comprising:
a secondary communication interface for communicating with a proxy device;
wherein the processing circuit is coupled to the secondary communication interface and configured to:
send a proxy request to the proxy device to monitor one or more control channels on behalf of the client terminal;
power off the wireless communication interface;
monitor a second control channel over the secondary communication interface for a data resume indicator from the proxy device.

17. The client terminal of claim 16 wherein the secondary communication interface is a low power interface relative to the wireless communication interface.

18. The client terminal of claim 16, wherein the data resume indicator from the proxy device precedes transmission of data for the communication session over the wireless communication interface by the access point.

19. The client terminal of claim 16, wherein the second control channel is an asynchronous control channel which is continuously monitored by the client terminal via the secondary communication interface.

20. The client terminal of claim 16, wherein upon receipt of a data resume indicator from the proxy device, the processing circuit is adapted to:
power on the wireless communication interface; and
monitor a traffic channel over the wireless communication interface for an expected data transmission for the communication session.

21. A method operational on a client terminal comprising:
establishing a communication session with an access point;
operating the client terminal in a connected mode using a data channel during the communication session, where the operating mode of the client terminal is known to the access point;
switching the client terminal to a lowered power mode after a period of inactivity in the data channel while the communication session remains active; and
monitoring a control channel for a data resume indicator from the access point, where the data resume indicator is sent by the access point prior to transmission of data for the communication session; and
receiving data from the access point in the lowered power mode over the control channel when the data is of a first size, otherwise switching to the connected mode prior to receiving the data from the access point over the data channel when the data is of a second size, wherein the second size is larger than the first size.

22. The method of claim 21, further comprising:
switching the client terminal to the connected mode upon receipt of the data resume indicator; and
monitoring the data channel for the data transmission from the access point.

23. The method of claim 22, further comprising:
receiving the data transmission from the access point over the data channel.

24. The method of claim 21, further comprising:
receiving the data transmission over the control channel while operating in the lowered power mode.

25. The method of claim 21, wherein the lowered power mode the control channel is monitored discontinuously and the data channel is not monitored to conserve power.

26. The method of claim 21, further comprising:
sending a proxy request to a proxy device to monitor one or more control channels on behalf of the client terminal;
power off a primary communication interface used for the communication session with the access point;
monitor a second control channel with the proxy device over a secondary communication interface for a data resume indicator from the proxy device.

27. The method of claim 26, wherein the data resume indicator from the proxy device precedes transmission of data for the communication session over the primary communication interface by the access point.

28. The method of claim 26, wherein upon receipt of a data resume indicator from the proxy device, the method further comprises:
powering on the primary wireless communication interface; and
monitoring a traffic channel over the wireless communication interface for an expected data transmission for the communication session.

29. A client terminal comprising:
means for establishing a communication session with an access point;
means for operating the client terminal in a connected mode using a data channel during the communication session, where the operating mode of the client terminal is known to the access point;
means for switching the client terminal to a lowered power mode after a period of inactivity in the data channel while the communication session remains active; and
means for monitoring a control channel for a data resume indicator from the access point, where the data resume indicator is sent by the access point prior to transmission of data for the communication session; and means for receiving data from the access point in the lowered power mode over the control channel when the data is of a first size, otherwise means for switching to the connected mode prior to receiving the data from the access point over the data channel when the data is of a second size, wherein the second size is larger than the first size.

30. The client terminal of claim 29, further comprising:
switching the client terminal to the connected mode upon receipt of the data resume indicator;
monitoring the data channel for the data transmission from the access point; and
receiving the data transmission from the access point over the data channel.

31. The client terminal of claim 29, wherein the lowered power mode the control channel is monitored discontinuously and the data channel is not monitored to conserve power.

32. A non-transitory processor-readable medium having one or more instructions operational on a client terminal for conserving power at the client terminal, which when executed by a processor causes the processor to:
establish a communication session with an access point;
operate the client terminal in a connected mode using a data channel during the communication session, where the operating mode of the client terminal is known to the access point;
switch the client terminal to a lowered power mode after a period of inactivity in the data channel while the communication session remains active;
monitor a control channel for a data resume indicator from the access point, where the data resume indicator is sent by the access point prior to transmission of data for the communication session; and
receive data from the access point in the lowered power mode over the control channel when the data is of a first size, otherwise switch to the connected mode prior to receiving the data from the access point over the data channel when the data is of a second size, wherein the second size is larger than the first size.

33. An access point, comprising:
a wireless communication interface for wirelessly communicating with a client terminal in a connected mode; and
a processing circuit coupled to the wireless communication interface and adapted to send data messages to the client terminal over a data channel via the wireless communication interface during a communication session, the processing circuit configured to
determine that the client terminal has switched to a lowered power mode, while the communication session remains active, due to inactivity over the data channel, and
send a data resume indicator to the client terminal over a control channel prior to transmission of additional data for the communication session; and
transmit data to the client terminal in the lowered power mode over the control channel when the data is of a first size, otherwise transmit the data to the client terminal in the connected mode over the data channel when the data is of a second size, wherein the second size is larger than the first size.

34. The access point of claim 33, wherein the processing circuit is further configured to:
receive a message from the client terminal indicating that the client terminal is switching to the lowered power mode.

35. The access point of claim 33, wherein the processing circuit is further configured to:
determine that the data channel has been inactive for a threshold amount of time; and
send a message to the client terminal indicating that the client terminal switch to the lowered power mode.

36. The access point of claim 33, wherein the processing circuit is further configured to:
receive data for the communication session, wherein the data resume indicator is sent in response to receipt of the data.

37. The access point of claim 33, wherein the processing circuit is further configured to:
send the data to the client terminal over the data channel after a fixed time offset from sending the data resume indicator.

38. The access point of claim 33, wherein the processing circuit is further configured to:
send the data to the client terminal over the data channel after the reception of a data resume indicator acknowledgement from the client terminal.

39. The access point of claim 33, wherein the processing circuit is further configured to:
send the data to the client terminal over the control channel.

40. The access point of claim 33, wherein the access point provides network connectivity to one or more client terminals.

41. The access point of claim 33, wherein the wireless communication interface is compatible with a Universal Mobile Telecommunications System (UMTS) Wideband Code Division Multiple Access (W-CDMA) air interface standard and the connected mode is one of a Radio Resource Control (RRC) Cell Dedicated Channel (CELL_DCH) mode or Cell Forward Access Channel (CELL_FACH) mode.

42. The access point of claim 33, wherein the wireless communication interface implements Evolved High-Speed Packet Access (HSPA+) and the control channel is a High Speed-Shared Control Channel (HS-SCCH).

43. The access point of claim 33, wherein the wireless communication interface is compatible with an Evolution-Data Only (EV-DO) air interface standard and the connected mode is an Active mode.

44. The access point of claim 43, wherein the control channel is a sub-synchronous control channel, enabling the client terminal to monitor only some control channel slots.

45. The access point of claim 33, wherein the access point operates as a femto cell and operates as a proxy for the client terminal, where the data resume indicator is sent to the client terminal via a secondary communication interface distinct from the wireless communication interface.

46. A method operational in an access point, comprising:
establishing a connected mode communication session with a client terminal;
wirelessly sending data messages to the client terminal over a data channel during the communication session;
determining that the client terminal has switched to a lowered power mode, while the communication session remains active, due to inactivity over the data channel;
sending a data resume indicator to the client terminal over a control channel prior to transmission of additional data for the communication session; and
transmitting data to the client terminal in the lowered power mode over the control channel when the data is of a first size, otherwise transmitting the data to the client terminal in the connected mode over the data channel when the data is of a second size, wherein the second size is larger than the first size.

47. The method of claim 46, further comprising:
receiving a message from the client terminal indicating that the client terminal is switching to the lowered power mode.

48. The method of claim 46, further comprising:
determining that the data channel has been inactive for a threshold amount of time; and
sending a message to the client terminal indicating that the client terminal switch to the lowered power mode.

49. The method of claim 46, further comprising:
receiving data for the communication session, wherein the data resume indicator is sent in response to receipt of the data.

50. The method of claim 46, further comprising:
sending the data to the client terminal over the data channel after a fixed time offset from sending the data resume indicator.

51. The method of claim 46, further comprising:
sending the data to the client terminal over the control channel.

52. The method of claim 46, wherein the processing circuit is further configured to:
send the data to the client terminal over the data channel after the reception of a data resume indicator acknowledgement from the client terminal.

53. An access point, comprising:
means for establishing a communication session with a client terminal in a connected mode;
means for wirelessly sending data messages to the client terminal over a data channel during the communication session;
means for determining that the client terminal has switched to a lowered power mode, while the communication session remains active, due to inactivity over the data channel;
means for sending a data resume indicator to the client terminal over a control channel prior to transmission of additional data for the communication session; and
means for transmitting data to the client terminal in the lowered power mode over the control channel when the data is of a first size, otherwise means for transmitting the data to the client terminal in the connected mode over the data channel when the data is of a second size, wherein the second size is larger than the first size.

54. The access point of claim 53, further comprising:
means for receiving a message from the client terminal indicating that the client terminal is switching to the lowered power mode.

55. The access point of claim 53, further comprising:
means for determining that the data channel has been inactive for a threshold amount of time; and
means for sending a message to the client terminal indicating that the client terminal switch to the lowered power mode.

56. The access point of claim 53, further comprising:
means receiving data for the communication session, wherein the data resume indicator is sent in response to receipt of the data.

57. A non-transitory processor-readable medium having one or more instructions operational in an access point for conserving power at a client terminal, which when executed by a processor causes the processor to:
establish a connected mode communication session with a client terminal;
wirelessly send data messages to the client terminal over a data channel during the communication session;
determine that the client terminal has switched to a lowered power mode due, while the communication session remains active, to inactivity over the data channel;
send a data resume indicator to the client terminal over a control channel prior to transmission of additional data for the communication session; and
transmitting data to the client terminal in the lowered power mode over the control channel when the data is of a first size, otherwise transmitting the data to the client terminal in the connected mode over the data channel when the data is of a second size, wherein the second size is larger than the first size.

58. A proxy device, comprising:
a first communication interface for wirelessly communicating with an access point;
a second communication interface for wirelessly communicating with a client terminal; and
a processing circuit coupled to the first and second communication interfaces and adapted to:
receive a request from a client terminal to operate as a proxy for the client terminal;
monitor for at least one of either:
data on a data channel from the client terminal via the first communication interface for a previously established communication session between the client terminal and the access point; and
a data resume indicator on a control channel for the client terminal via the first communication interface, where the data resume indicator precedes the transmission of additional data for the previously established communication session between the client terminal and the access point;
send the data resume indicator to the client terminal via the second communication interface for resumption of the previously established communication session; and
transmitting data to the client terminal via the second communication interface when the data is of a first size, otherwise transmitting the data to the client terminal via the first communication interface when the data is of second size, wherein the second size is larger than the first size.

59. The proxy device of claim 58, wherein the second communication interface has lower power and shorter range transmission relative the first communication interface.

60. The proxy device of claim 58, wherein the access point believes that the client terminal is operating in a lowered power mode where the client terminal is monitoring its control channel for the data resume indicator.

61. The proxy device of claim 58, wherein the processing circuit is further adapted to:
receive a data resume indicator acknowledgment from the client terminal over the second communication interface; and
transmitting the data resume indicator acknowledgement to the access point via the first communication interface.

62. The proxy device of claim 58, wherein the processing circuit is further adapted to:
monitor a data channel for the client terminal over the first communication interface for incoming data for the previously established communication session; and
forward received data to the client terminal.

63. The proxy device of claim 58, wherein the data resume indicator is asynchronously transmitted to the client terminal over a control channel via the second communication interface.

64. A method operational on a proxy device, comprising:
receiving a request from a client terminal to operate as a proxy for the client terminal;
monitoring for at least one of either:
- data on a data channel from the client terminal via the first communication interface for a previously established communication session between the client terminal and an access point; and
- a data resume indicator on a control channel for the client terminal via a first communication interface of the proxy device, where the data resume indicator precedes the transmission of additional data for the previously established communication session between the client terminal and an access point;

sending the data resume indicator to the client terminal via a second communication interface of the proxy device for resumption of the previously established communication session; and
transmitting data to the client terminal via the second communication interface when the data is of a first size, otherwise transmitting the data to the client terminal via the first communication interface when the data is of second size, wherein the second size is larger than the first size.

65. The proxy device of claim 64, further comprising:
receiving a data resume indicator acknowledgment from the client terminal over the second communication interface; and
transmitting the data resume indicator acknowledgement to the access point via the first communication interface.

66. The proxy device of claim 64, further comprising:
monitoring a data channel for the client terminal over the first communication interface for incoming data for the previously established communication session; and
forwarding received data to the client terminal.

67. A proxy device, comprising:
means for receiving a request from a client terminal to operate as a proxy for the client terminal;
means for monitoring for at least one of either:
- data on a data channel from the client terminal via the first communication interface for a previously established communication session between the client terminal and the access point; and
- a data resume indicator on a control channel for the client terminal via a first communication interface of the proxy device, where the data resume indicator precedes the transmission of additional data for the previously established communication session between the client terminal and an access point;

means for sending the data resume indicator to the client terminal via a second communication interface of the proxy device for resumption of the previously established communication session; and
means for transmitting data to the client terminal via the second communication interface when the data is of a first size, otherwise means for transmitting the data to the client terminal via the first communication interface when the data is of second size, wherein the second size is larger than the first size.

68. A non-transitory processor-readable medium having one or more instructions operational in a proxy device for facilitating power conservation in client terminals, which when executed by a processor causes the processor to:
receive a request from a client terminal to operate as a proxy for the client terminal;
monitor for at least one of either:
- data on a data channel from the client terminal via the first communication interface for a previously established communication session between the client terminal and the access point; and
- a data resume indicator on a control channel for the client terminal via a first communication interface of the proxy device, where the data resume indicator precedes the transmission of additional data for the previously established communication session between the client terminal and an access point;

send the data resume indicator to the client terminal via a second communication interface of the proxy device for resumption of the previously established communication session; and
transmit data to the client terminal via the second communication interface when the data is of a first size, otherwise transmit the data to the client terminal via the first communication interface when the data is of second size, wherein the second size is larger than the first size.

\* \* \* \* \*